United States Patent
Elliott et al.

(10) Patent No.: US 8,019,836 B2
(45) Date of Patent: ***Sep. 13, 2011

(54) WIRELESS COMMUNICATION ENABLED METER AND NETWORK

(75) Inventors: Karl E. Elliott, Atlanta, GA (US); Kenneth W. Garrard, Atlanta, GA (US)

(73) Assignee: Mesh Comm, LLC, Atlanta, GA (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/030,527

(22) Filed: Feb. 13, 2008

(65) Prior Publication Data

US 2008/0132185 A1   Jun. 5, 2008

Related U.S. Application Data

(63) Continuation of application No. 10/040,150, filed on Jan. 2, 2002, now Pat. No. 7,379,981.

(51) Int. Cl.
*G06F 15/16* (2006.01)
*G06F 12/00* (2006.01)

(52) U.S. Cl. ........................... 709/220; 709/223

(58) Field of Classification Search .......... 709/220–221, 709/217–218, 223–229, 250
See application file for complete search history.

(56) References Cited

U.S. PATENT DOCUMENTS

| | | | |
|---|---|---|---|
| 3,900,842 A | 8/1975 | Calabro et al. |
| 4,939,726 A | 7/1990 | Flammer et al. |
| 5,007,052 A | 4/1991 | Flammer et al. |
| 5,056,107 A | 10/1991 | Johnson et al. |
| 5,115,433 A | 5/1992 | Baran et al. |
| 5,130,987 A | 7/1992 | Flammer |
| 5,453,977 A | 9/1995 | Flammer et al. |

(Continued)

FOREIGN PATENT DOCUMENTS

EP   0629098 B1   12/2001

(Continued)

OTHER PUBLICATIONS

Charles Goldman et al., Impact of Information and Communications Technologies on Residential Customer Energy Services, Oct. 1996.

(Continued)

*Primary Examiner* — Zarni Maung
(74) *Attorney, Agent, or Firm* — Duane S. Kobayashi

(57) ABSTRACT

A meter enabled for wireless communication and a wireless communication network are disclosed. A meter enabled for wireless communication comprises a metering device, a wireless communication system and an interface between the two. Meter data can be read, and the meter can be controlled via communication with a wireless network using, e.g., the Bluetooth™ protocol A self-configuring wireless network is also disclosed. The wireless network includes a number of vnodes, and one or more VGATES. The vnodes are devices that are enabled for wireless communication using, e.g., the Bluetooth™ protocol. Vnodes are operative to form ad hoc piconet connections. The one or more VGATES comprise computer network gateways that are enabled for wireless communication using, e.g., the Bluetooth™ protocol. Thus, the VGATES enable the wireless array of vnodes to communicate with a private or public computer network to transmit data or receive commands. The network may also communicate with a VNOC system. VNOC is a universal communications adapter that enables the wireless array of vnodes to communicate (either directly or through a VGATE) with a central control facility via various wireless or wired communication media.

30 Claims, 14 Drawing Sheets

U.S. PATENT DOCUMENTS

| | | | |
|---|---|---|---|
| 5,459,727 A | 10/1995 | Vannucci | |
| 5,471,469 A | 11/1995 | Flammer et al. | |
| 5,479,400 A | 12/1995 | Dilworth et al. | |
| 5,488,608 A | 1/1996 | Flammer | |
| 5,553,094 A | 9/1996 | Johnson et al. | |
| 5,570,084 A | 10/1996 | Ritter et al. | |
| 5,588,005 A | 12/1996 | Ali et al. | |
| 5,608,780 A | 3/1997 | Gerszberg et al. | |
| 5,633,875 A | 5/1997 | Hershey et al. | |
| 5,673,252 A | 9/1997 | Johnson et al. | |
| 5,719,564 A | 2/1998 | Sears | |
| 5,727,057 A | 3/1998 | Emery et al. | |
| 5,757,783 A | 5/1998 | Eng et al. | |
| 5,801,643 A | 9/1998 | Williams et al. | |
| 5,818,828 A | 10/1998 | Packer et al. | |
| 5,844,893 A | 12/1998 | Gollnick et al. | |
| 5,850,592 A | 12/1998 | Ramanathan | |
| 5,874,903 A | 2/1999 | Shuey et al. | |
| 5,898,826 A | 4/1999 | Pierce et al. | |
| 5,903,566 A | 5/1999 | Flammer | |
| 5,905,784 A | 5/1999 | Garland et al. | |
| 5,909,493 A | 6/1999 | Motoyama | |
| 5,940,771 A | 8/1999 | Gollnick et al. | |
| 5,963,146 A | 10/1999 | Johnson et al. | |
| 5,970,059 A | 10/1999 | Ahopelto et al. | |
| 5,987,011 A | 11/1999 | Toh | |
| 5,991,806 A | 11/1999 | McHann, Jr. | |
| 6,026,297 A | 2/2000 | Haartsen | |
| 6,028,522 A | 2/2000 | Petite | |
| 6,044,062 A | 3/2000 | Brownrigg et al. | |
| 6,073,169 A | 6/2000 | Shuey et al. | |
| 6,075,777 A | 6/2000 | Agrawal et al. | |
| 6,078,785 A | 6/2000 | Bush | |
| 6,088,659 A | 7/2000 | Kelley et al. | |
| 6,097,703 A | 8/2000 | Larsen et al. | |
| 6,100,817 A | 8/2000 | Mason et al. | |
| 6,163,276 A | 12/2000 | Irving et al. | |
| 6,172,616 B1 | 1/2001 | Johnson et al. | |
| 6,195,018 B1 | 2/2001 | Ragle et al. | |
| 6,218,953 B1 | 4/2001 | Petite | |
| 6,246,677 B1 | 6/2001 | Nap et al. | |
| 6,246,689 B1 | 6/2001 | Shavitt | |
| 6,249,516 B1 | 6/2001 | Brownrigg et al. | |
| 6,275,500 B1 | 8/2001 | Callaway et al. | |
| 6,298,053 B1 | 10/2001 | Flammer et al. | |
| 6,304,556 B1 | 10/2001 | Haas | |
| 6,307,843 B1 | 10/2001 | Okanoue | |
| 6,329,902 B1 | 12/2001 | Lee et al. | |
| 6,333,975 B1 | 12/2001 | Brunn et al. | |
| 6,363,057 B1 | 3/2002 | Ardalan et al. | |
| 6,366,217 B1 | 4/2002 | Cunningham et al. | |
| 6,373,399 B1 | 4/2002 | Johnson et al. | |
| 6,377,549 B1 | 4/2002 | Ngo et al. | |
| 6,396,839 B1 | 5/2002 | Ardalan et al. | |
| 6,407,991 B1 | 6/2002 | Meier | |
| 6,421,731 B1 | 7/2002 | Ciotti, Jr. et al. | |
| 6,437,692 B1 | 8/2002 | Petite et al. | |
| 6,456,599 B1 | 9/2002 | Elliott | |
| 6,480,497 B1 | 11/2002 | Flammer et al. | |
| 6,480,505 B1 | 11/2002 | Johansson et al. | |
| 6,509,841 B1 | 1/2003 | Colton et al. | |
| 6,519,460 B1 | 2/2003 | Haartsen | |
| 6,526,581 B1 | 2/2003 | Edson | |
| 6,535,498 B1 | 3/2003 | Larsson et al. | |
| 6,538,577 B1 | 3/2003 | Ehrke et al. | |
| 6,577,671 B1 | 6/2003 | Vimpari | |
| 6,584,100 B1 | 6/2003 | Ngo | |
| 6,590,928 B1 | 7/2003 | Haartsen | |
| 6,606,708 B1 | 8/2003 | Shifrin et al. | |
| 6,618,709 B1 | 9/2003 | Sneeringer | |
| 6,636,894 B1 | 10/2003 | Short et al. | |
| 6,681,232 B1 | 1/2004 | Sistanizadeh et al. | |
| 6,684,245 B1 | 1/2004 | Shuey et al. | |
| 6,691,173 B2 | 2/2004 | Morris et al. | |
| 6,697,331 B1 | 2/2004 | Riihinen et al. | |
| 6,697,421 B1 | 2/2004 | Monroe et al. | |
| 6,704,301 B2 | 3/2004 | Chari et al. | |
| 6,711,166 B1 | 3/2004 | Amir et al. | |
| 6,714,787 B2 | 3/2004 | Reed et al. | |
| 6,718,137 B1 | 4/2004 | Chin | |
| 6,725,281 B1 | 4/2004 | Zintel et al. | |
| 6,728,514 B2 | 4/2004 | Bandeira et al. | |
| 6,735,178 B1 | 5/2004 | Srivastava et al. | |
| 6,735,630 B1 | 5/2004 | Gelvin et al. | |
| 6,751,200 B1 | 6/2004 | Larsson et al. | |
| 6,751,455 B1 | 6/2004 | Acampora | |
| 6,751,672 B1 | 6/2004 | Khalil et al. | |
| 6,754,250 B2 | 6/2004 | Haartsen | |
| 6,775,258 B1 | 8/2004 | van Valkenburg et al. | |
| 6,795,688 B1 | 9/2004 | Plasson et al. | |
| 6,816,480 B1 | 11/2004 | Monroe et al. | |
| 6,820,049 B1 | 11/2004 | Monroe et al. | |
| 6,823,186 B2 | 11/2004 | Salokannel et al. | |
| 6,826,620 B1 | 11/2004 | Mawhinney et al. | |
| 6,829,216 B1 | 12/2004 | Nakata | |
| 6,829,347 B1 | 12/2004 | Odiaka | |
| 6,831,921 B2 | 12/2004 | Higgins | |
| 6,839,539 B2 | 1/2005 | Durrant et al. | |
| 6,865,185 B1 * | 3/2005 | Patel et al. | 370/412 |
| 6,865,371 B2 | 3/2005 | Salonidis et al. | |
| 6,871,193 B1 | 3/2005 | Campbell et al. | |
| 6,876,643 B1 | 4/2005 | Aggarwal et al. | |
| 6,891,838 B1 | 5/2005 | Petite et al. | |
| 6,904,025 B1 | 6/2005 | Madour et al. | |
| 6,933,857 B2 | 8/2005 | Foote | |
| 6,975,613 B1 | 12/2005 | Johansson | |
| 6,980,524 B1 | 12/2005 | Lu et al. | |
| 6,999,441 B2 | 2/2006 | Flammer et al. | |
| 7,016,336 B2 | 3/2006 | Sorensen | |
| 7,053,767 B2 | 5/2006 | Petite et al. | |
| 7,054,271 B2 | 5/2006 | Brownrigg et al. | |
| 7,058,050 B2 | 6/2006 | Johansson et al. | |
| 7,061,924 B1 | 6/2006 | Durrant et al. | |
| 7,103,511 B2 | 9/2006 | Petite | |
| 7,159,035 B2 | 1/2007 | Garcia-Luna-Aceves et al. | |
| 7,164,885 B2 | 1/2007 | Jonsson et al. | |
| 7,197,330 B1 | 3/2007 | Monroe et al. | |
| 7,225,275 B2 | 5/2007 | Medin | |
| 7,379,981 B2 * | 5/2008 | Elliott et al. | 709/220 |
| 7,448,079 B2 * | 11/2008 | Tremain | 726/14 |
| 7,468,661 B2 | 12/2008 | Petite et al. | |
| 2001/0002908 A1 | 6/2001 | Rune et al. | |
| 2001/0036810 A1 | 11/2001 | Larsen | |
| 2001/0046879 A1 | 11/2001 | Schramm et al. | |
| 2002/0012358 A1 | 1/2002 | Sato | |
| 2002/0044549 A1 | 4/2002 | Johansson et al. | |
| 2003/0009301 A1 | 1/2003 | Anand et al. | |
| 2003/0012173 A1 | 1/2003 | Rune | |
| 2003/0101284 A1 * | 5/2003 | Cabrera et al. | 709/313 |
| 2004/0097190 A1 | 5/2004 | Durrant et al. | |
| 2005/0058144 A1 | 3/2005 | Ayyagari et al. | |

FOREIGN PATENT DOCUMENTS

| | | |
|---|---|---|
| WO | WO 98/10299 A1 | 3/1998 |
| WO | WO 98/10394 A1 | 3/1998 |
| WO | WO 99/13426 A1 | 3/1999 |

OTHER PUBLICATIONS

Specification of the Bluetooth System, Bluetooth, Version 1.0B, vol. 1, Dec. 1, 1999. (remainder viewable at http://grouper.ieee.org/groups/802/15/Bluetooth/core_10_b.pdf).

Specification of the Bluetooth System, Bluetooth, Version 1.0B, vol. 2, Dec. 1, 1999. (remainder viewable at http://grouper.ieee.org/groups/802/15/Bluetooth/profile_10_b.pdf).

"Amron Technologies Successfully Deploys Advanced Metering Solution for C&I Customers Using Bluetooth," Sep. 3, 2004, 2 pages.

Utility Intelligence, http://www.empoweringutilities.com/hardware.html, printed from the website on May 12, 2005, 29 pages.

Amron Meter Management System, http://www.amronm5.com/products/, printed from the website on May 12, 2005, AMRON Technologies, Inc., 41 pages.

J. Haartsen, "An Overview on Bluetooth, Ericsson Mobile Communications," Oct. 1999.

J. Haartsen et al., "Blueetooth: Vision, Goals, and Architecture," Mobile Computing and Communications Review, vol. 1, No. 2, 1998.

J. Haartsen, "The Bluetooth Radio System," IEEE Personal Communications, Feb. 2000.
J. Haartsen, Bluetooth—The universal radio interfade for ad hoc, wireless connectivity, Ericsson Review No. 3, 1998.
R. Mettala, Bluetooth Protocol Architecture, Version 1.0, Bluetooth White Paper, Aug. 25, 1999.
The Ricochet Wireless Network Overview, Metricom, Jan. 1, 1997.
Ricochet Technical Information and White Papers, Wireless Data Communications: Security, Sep. 23, 1998.
Appendix A, Selected Vendor Telecommunications Products.
T. Muller, Bluetooth Security Architecture, Version 1.0, Bluetooth White Paper, Jul. 15, 1999.
B. Miller, "Mapping Salutation Architecture API's to Bluettooth Service Discovery Layer, Version 1.0," Bluetooth White Paper, Jul. 1, 1999.
R. Mettala, Bluetooth PC Card Transport Layer, Version 1.0, Bluetooth White Paper, Aug. 25, 1999.
Technology Review: Metricom's Ricochet Packet Radio Network, Virtual Publishing, 1996.
Michael W Ritter et al., "The Architecture of Metricom's Microcellular Data Network (MCDN) and Details of its Implementation as the Second and Third Generation Ricochet Wide Area Mobile Data Service," IEEE, 2001.
List of Cities with Ricochet Coverage, Metricom, 1998.
What's Behind Ricochet: A Network Overview, Metricom, 2000.
What's Behind Ricochet: A Network Overview, Metricom, 2000.
Phil Wherry, A Review of the Ricochet Wireless Internet Service, 2000.
This is Ricochet Mobile Internet Access. Metricom, 1998.
Ricochet Technical Support, Metricom, 1998.
Welcome to UtiliNet, Metricom, 1998.
Industrial Communications, Metricom, 1999.
InternetFundManager.com, Institutional Research, Metricom Inc., 2000.
T. Muller, Errata Request, Bluetooth Specification V 1.0B Profile, Mar. 14, 2000.
Mesh Comm, LLC, E.On LLC, et al., Civil Action No. 3:09CV-641-S, Joint Claim Construction Statement and Identification of Extrinsic Evidence, Jul. 9, 2010.
Mesh Comm, LLC, E.On LLC, et al., Civil Action No. 3:09CV-641-S, Defendants E.On, Louisville Gas and Electric Company, and Trilliant Networks, Inc.'s Opening Claim Construction Brief, Sep. 7, 2010.
Mesh Comm, LLC, E.On LLC, et al., Civil Action No. 3:09CV-641-S, Plaintiff Mesh Comm, LLC's Opening Claim Construction Brief, Sep. 7, 2010.
Mesh Comm, LLC, E.On LLC, et al., Civil Action No. 3:09CV-641-S, Declaration of Eizabeth Belding, PhD., in Support of Defendants' Opening Claim Construction Brief, Sep. 24, 2010.
Mesh Comm, LLC, E.On LLC, et al., Civil Action No. 3:09CV-641-S, Defendants E.On, Louisville Gas and Electric Company, and Trilliant Networks, Inc.'s Responsive Claim Construction Brief, Sep. 27, 2010.
*Mesh Comm, LLC* v. *Pepco Energy Services, et al.*, Case No. 1:09-cv-02804-RDB, Defendants' Initial Disclosure of Prior Art, Mar. 1, 2010.
*Mesh Comm, LLC* v. *Pepco Energy Services, et al.*, Case No. 1:09-cv-02804-RDB, Plaintiff's Claim Chart and Proposed Claim Construction Statement, Apr. 5, 2010.
*Mesh Comm, LLC* v. *Pepco Energy Services, et al.*, Case No. 1:09-cv-02804-RDB, Defendants' Responsive Claim Chart and Responsive Claim Construction Statement, Apr. 30, 2010.
*Mesh Comm, LLC* v. *Pepco Energy Services, et al.*, Case No. 1:09-cv-02804-RDB, Defendants' Responsive Claim Chart and Responsive Claim Construction Statement, May 3, 2010.
*Mesh Comm, LLC* v. *Pepco Energy Services, et al.*, Case No. 1:09-cv-02804-RDB, Plaintiff's Opening Claim Construction Brief, Jul. 15, 2010.
*Mesh Comm, LLC* v. *Pepco Energy Services, et al.*, Case No. 1:09-cv-02804-RDB, Defendants' Responsive Claim Construction Brief, Aug. 30, 2010.
*Mesh Comm, LLC* v. *Pepco Energy Services, et al.*, Case No. 1:09-cv-02804-RDB, Declaration of David B. Johnson, PhD. In Support of Defendants' Responsive Claim Construction Brief, Aug. 30, 2010.
*Mesh Comm, LLC* v. *Pepco Energy Services. et al.*, Case No. 1:09-cv-02804-RDB, Declaration of David B. Schumann in Support of Silver Spring Network, Inc.'s Responsive Claim Construction Brief, Aug. 30, 2010.
*Mesh Comm, LLC* v. *Pepco Energy Services, et al.*, Case No. 1:09-cv-02804-RDB, Plaintiff's Reply Claim Construction Brief, Sep. 16, 2010.
*Mesh Comm, LLC* v. *Pepco Energy Services, et al.*, Case No. 1:09-cv-02804-RDB, Defendants' Reply Re Motion for Summary Judgment, Sep. 23, 2010.
*Mesh Comm, LLC* v. *Pepco Energy Services, et al.*, Case No. 1:09-cv-02804-RDB, Memorandum Opinion, Dec. 29, 2010.
*Mesh Comm, LLC* v. *Pepco Energy Services, et al.* Case No. 1:09-cv-02804-RDB, Expert Report of David B. Johnson Regarding Invalidity, Apr. 29, 2011.
Market Requirements Dcoument—Autobahn.
Metricom Autobahn Routing Software Design Description, Jan. 22, 1997.
Metricom Autobahn Routing Software Requirements Specification, Nov. 7, 1996.
Mike Ritter, Ricochet Security, Version 1.0, Jun. 26, 1995.
Brett Galloway, Next-Generation MCDN Architecture & Performance, Version 0.01 (Draft), Mar. 18, 1995.
Metricom MCDN Communications System MicroCellular Data Network: Architecture and Protocol Specification, Version 0.00 Draft 2, May 20, 1997.
Siamak Mirnezami, Metricom Wireless Modem Ricochet II: Subscriber Device Theory of Operation, Version 1.0, Oct. 7, 1998.
NgRouting FAQ, Jul. 15, 1998.
Metricom, Radio Command Reference Guide, Phase 2 Alpha, Version 1, Oct. 7, 1998.
John Bettendorff, Wanless Routing, Metricom.
Metricom's microcellular data network now operates at 100 Kilobits per second; fastest available wireless area network, Nov. 18, 1994.
Metricom Expects to Provide 85K wireless data, Mar. 31, 1997.
Federal Communications Commission, Grant of Equipment Authorization, Certification, Jul. 5, 2000.
Ricochet's Most Frequently Asked Questions (FAQ), 1997.
Metricom Launches Ricochet High-Speed Wireless Internet in San Diego; Mobile Users in San Diego Can Now Access Information at 128 kbps, Jul. 21, 2000.

* cited by examiner

STEP 1:

a to m are broadcasting request message after pseudo-random delays. V is broadcasting message identifying itself as a VGATE.

STEP 2:

a to i are still broadcasting request message after pseudo-random delays.
j, k, l and m have route to VGATE with metric 0 configured.
V is broadcasting message identifying itself as a VGATE.

STEP 3:

a to d are still broadcasting request message after pseudo-random delays.
e has a route to the VGATE, but the metric for it is too high.
f,g,h,i have multiple routes(based on metric grayed ones are discarded).
(primary gateways are sent acknowledgement messages)

V is broadcasting messages identifying itself as a VGATE.

WIRELESS COMMUNICATION ENABLED METER AND NETWORK

The present application is a continuation of non-provisional U.S. application Ser. No. 10/040,150, filed Jan. 2, 2002, which is a continuation of non-provisional application No. 09/774,121, filed Jan. 31, 2001 and a continuation in part of non-provisional application No. 09/621,965, filed Jul. 21, 2000. Non-provisional application No. 09/774,121 claims priority to provisional application No. 60/179,046, filed Jan. 31, 2000, and provisional application No. 60/179,041, filed Jan. 31, 2000.

The subject matter of this application is related to the subject matter of copending U.S. Patent application Ser. Nos. 60/179,041, 60/179,046 and 09/621,965, entitled "Wireless Communication Enabled Meter and Network," "Wireless Communication Enabled Meter and Network," and "System and Method for a Virtual Network Operations Center," respectively, each having the same inventors as this application, each being assigned or under obligation of assignment to the same assignee as this application and each incorporated herein by reference.

FIELD OF THE INVENTION

This invention relates to a meter that is enabled for wireless communication More specifically, this invention relates to a meter, such as a utility meter, that is enabled for wireless communication. The invention also relates to a self-configuring, wireless network that enables data capture at a plurality of metering sites and wireless transmission of the captured data from the plurality of metering sites to one or more collection points.

BACKGROUND OF THE INVENTION

Remote communication with meters is known, for example, for home load control and for usage monitoring. Commands for home load control are typically transmitted over telephone lines or power lines. Communicating via power lines or telephone lines is slow and subject to physical disruption. Moreover, communicating via power lines or telephone lines presents the possibility of spurious signals, crosstalk, and other interference. One-way or two-way radios are also sometimes used. Both are expensive and two-way radios also require a license.

With regard to usage monitoring, on the other hand, utility meters are normally read by a person visiting the meter. In recent years, a number of schemes have been contemplated to accumulate usage data, as by counting wheel revolutions per unit time and storing such information as a preliminary necessity for actually automatically transmitting such information upon command of a remote central station.

Local area networks that interconnect via cables are also known. These networks are expensive to install and somewhat intrusive in that cables must be run to physically interconnect the various nodes in the network. Moreover, networks that are interconnected with cables are subject to physical disruption of the cables.

Recently, wireless networks have been developed. These networks can be used to collect information from, and to disseminate information to individual nodes of the network. For example, conventional wireless networks generally operate using a loop configuration in which each node in the network is interconnected and communicates only with two neighboring nodes. Information and/or commands are passed from node to node around the loop until they arrive at a master node. The master node is used to communicate information that is gathered to a central station, or to accept and distribute information received from a central station throughout the network.

Conventional wireless networks, however, have limitations as well. For example, because conventional wireless networks generally have a loop configuration, when one node is disabled, the integrity of the entire network is affected. Moreover, if the master node of such a conventional network is disabled, the network becomes isolated.

These and other drawbacks exist with current systems.

SUMMARY OF THE INVENTION

An object of the invention is to overcome these and other drawbacks in existing systems.

Another object of the invention is to provide a meter that is enabled for wireless communication.

Another object of the invention is to provide a self-configuring wireless network.

According to one embodiment, a wireless communication enabled meter is disclosed. A meter enabled for wireless communication comprises a metering device, a wireless communication system and an interface between the two. The metering device is a standard programmable metering device that can measure usage data and control usage. The wireless communication system is enabled for wireless communication using, e.g., the Bluetooth™ protocol. The interface facilitates communication between the metering device and the communication system so that meter data can be read with a wireless network using, e.g., the Bluetooth™ protocol.

According to another embodiment, a self-configuring wireless network is disclosed. The wireless network comprises a number of virtual nodes ("vnodes"), and one or more virtual gates ("VGATES"). Vnodes are operative to form ad hoc piconet connections. Vnodes can comprise a variety of devices. Data traveling through the network is passed from one or more ad hoc piconets to one or more of the vnodes or an uploading point, e.g., a VGATE. If a vnode is not connected to a piconet, or if its connection to a piconet has been disturbed, the vnode executes a self-configuration routine to connect itself with another piconet. This self configuration process is based on a set of rules. The one or more VGATES comprise computer network gateways enabled for communication.

Other features and advantages of the present invention will be apparent to one of ordinary skill in the art upon reviewing the detailed description of the present invention.

DETAILED DESCRIPTION OF THE PREFERRED EMBODIMENTS

Figure 1:
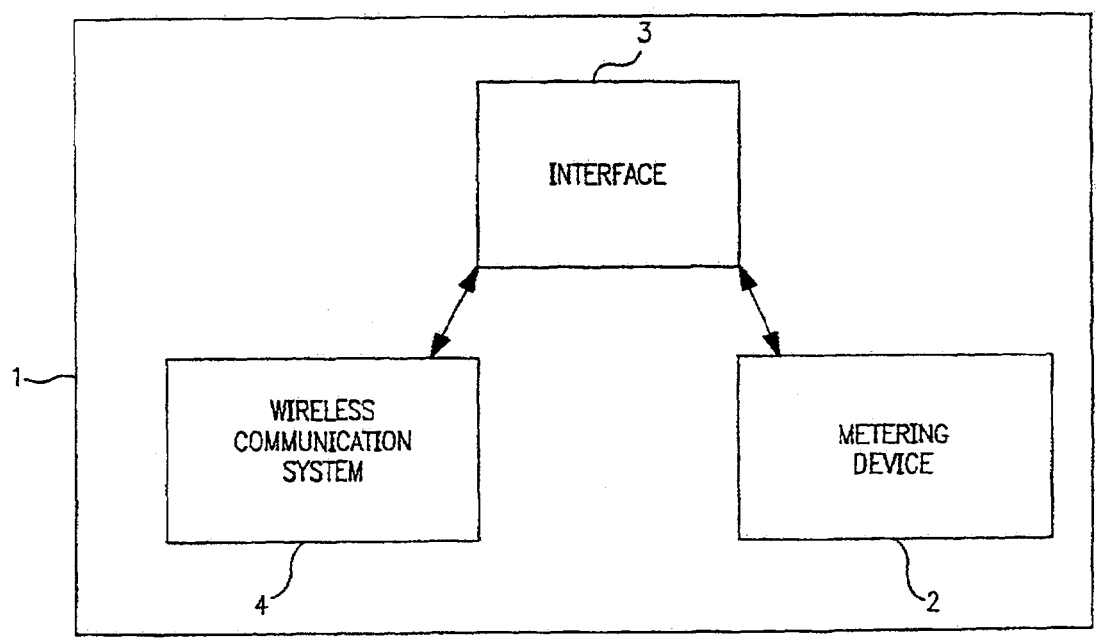
FIG. 1 is a schematic diagram of a wireless communication enabled meter.

FIG. 1 schematically depicts a meter 1 that is enabled for wireless communication. Meter 1 may comprise metering device 2, interface 3 and wireless communication transceiver 4. In operation, metering device 2 may communicate with wireless communication transceiver 4 via interface 3. Wireless communication transceiver 4, in turn, may communicate with other wireless communication enabled devices, for example, other meters 1 or a central station. Wireless communication transceiver 4 may be operative to transmit data to and receive data from other meters 1 equipped with transceivers 4.

Metering device 2 operates to measure and regulate the usage of some utility, e.g., natural gas, electricity, or water. According to one embodiment, metering device 2 comprises any known metering device capable of producing an analog or digital output signal indicative of utility usage. In another embodiment, metering device 2 comprises a metering device capable of accepting an analog or digital input signal and for monitoring and controlling utility usage. For example, metering device 2 is operative to monitor utility usage. Utility usage data is useful in the electrical industry, for example, to control future generation in order to avoid over generation or under generation of electricity. According to another example, metering device 2 is operative to monitor power quality, The power factor of electrical power, for example, may vary with usage. Metering device 2 can monitor this variance. In turn, household devices that are also enabled for wireless communication can be controlled to change the load and correct the power factor. According to one particular embodiment, metering device 2 comprises the Altimus™ produced and sold by Landis & Gyr Utilities Services, Inc.

Interface 3 facilitates communication between meter 1 and wireless communication transceiver 4. According to one embodiment, interface 3 receives digital signals from wireless communication transceiver 4 and in response produces digital control signals for meter 1 and/or metering device 2. Interface 3 also receives digital signals from metering device 2 and outputs digital signals suitably formatted for transmission through wireless communication transceiver 4. According to one embodiment, interface 3 comprises a software module. According to another embodiment, interface 3 is implemented in firmware or hardware. Conventional interfaces may be employed as interface 3 in some embodiments of the invention.

Wireless communication transceiver 4 operates to wirelessly transmit and receive data and other information. According to one embodiment, wireless communication transceiver 4 is operative to receive control information and to transmit usage data accumulated by metering device 2. According to one particular embodiment, wireless communication transceiver 4 comprises a Bluetooth™ communication chip. Bluetooth™ is explained in detail in Bluetooth [sic] Document Page (visited Nov. 15, 1999), <http://www.bluetooth.com/document/default.asp?page=overview> (Bluetooth™ Specification), herein incorporated by reference. According to another embodiment, wireless communication transceiver 4 comprises a transceiver operative to communicate using another suitable wireless transmission protocol, such as an ultrawide band protocol.

Briefly, Bluetooth™ is a wireless communication protocol operating in the unlicensed ISM band at 2.4 GHz that enables wireless communication of data and voice. The Bluetooth™ system operates through a collection of short-range radio links, built into 9×9 mm microchips, i.e., Bluetooth™ chips. The short-range radio links enable ad hoc groupings of connected devices away from fixed network infrastructures.

Bluetooth™ uses an acknowledgment and frequency hopping scheme to make network links robust. Specifically, Bluetooth™ radio modules avoid interference from other signals by hopping to a new frequency after transmitting or receiving a packet of data. The Bluetooth™ radio uses faster hopping and shorter packets than other systems operating in the same frequency band Short packages and fast hopping make the Bluetooth™ system robust, e.g., by limiting the impact of domestic and professional microwave ovens and other potential sources of interference.

Bluetooth™ uses Forward Error Correction (FEC) to limit the impact of random noise on long-distance links. The encoding is optimized for an uncoordinated environment. A frequency hop transceiver is applied to combat interference and fading. A shaped, binary FM modulation is applied to minimize transceiver complexity. The gross data rate is 1 Mb/s. A Time-Division Duplex scheme is used for full-duplex transmission.

The Bluetooth™ baseband protocol is a combination of circuit and packet switching. Slots can be reserved for synchronous data packets. Each data packet is transmitted in a different hop frequency. A packet nominally covers a single slot, but can be extended to cover up to five slots. Bluetooth™ supports an asynchronous data channel, up to three simultaneous synchronous voice channels, or a channel which simultaneously supports asynchronous data and synchronous voice. Each voice channel supports 64 kb/s synchronous (voice) link. The asynchronous channel can support an asymmetric link of maximally 721 kb/s in either direction while permitting 57.6 kb/s in the return direction, or a 432.6 kb/s symmetric link.

Using Bluetooth™, meter 1 transmits data to, for example, a central collection point via other Bluetooth™ enabled devices (e.g., other Bluetooth™ enabled meters) forming an ad hoc network. Moreover, meter 1 receives data from a central controller via other Bluetooth™ enabled devices through a similar type of ad hoc network.

According to another embodiment of the present invention, a self-configuring (i.e., ad hoc) wireless network is disclosed. A self-configuring wireless network may be advantageously formed using the wireless communication enabled meters disclosed in conjunction with FIG. 1. A self-configuring wireless network will be explained in more detail in connection with FIG. 2.

Figure 2:
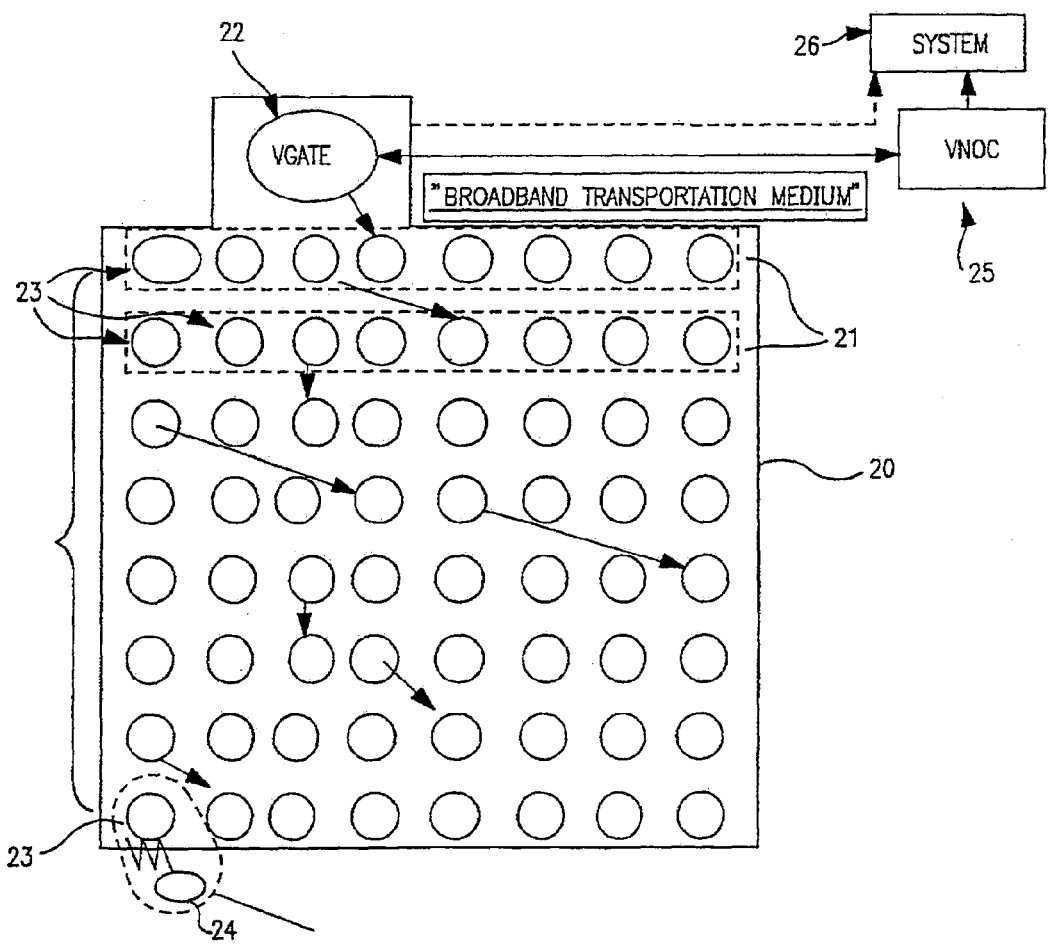
FIG. 2 is a schematic depiction of a self-configuring wireless network according to another embodiment of the present invention.

FIG. 2 schematically depicts an embodiment of a self-configuring wireless network 20 according to the present invention. Network 20 may comprise a number of piconets 21 and a VGATE 22. Each piconet 21 may comprise a plurality of individually addressable vnodes 23 that are wirelessly linked together. For example, in a Bluetooth™ system, a piconet may comprise a plurality of Bluetooth™ units sharing a common channel.

According to one embodiment, network 20 comprises a number of layers. The layers may include (1) A layer for configuring the network. This layer is used to establish and support connections between the various vnodes 23 to VGATE 22. (2) A layer for upstream communications, i.e., communications from vnodes 23 to VGATE 22. And, (3) A layer for downstream communications, i.e., communications from a central computer network to vnodes 23 through VGATE 22.

These layers may be in addition to the layers that may be present in a particular wireless communication transport agent that may be used. According to one particular embodiment, these three layers are established using the proprietary Telemetry Technologies Communications Protocol™ ("TTCOM™") established by Telemetry Technologies.

TTCOM™ is a communications protocol used for inter-device communications for Telemetry Technologies™ products. TTCOM™ does not explicitly specify the transport media of communication between devices. The physical and data layer capabilities may be device specific and may be modified to suit different hardware needs. For example, TTCOM™ may be implemented on a Serial RS232 link, a SPI bus connection, a parallel interface, a radio network, a network connection (TCP/IP), the Internet or any other means used to exchange octets reliably between two devices.

The TTCOM™ may be peer-to-peer, i.e. all devices are equal and can query each other. All communications may be in a half-duplex Poll Response (client/server) format, i.e. each query from a client device may generate a response from the server device. Only one request from any client to any server may be outstanding at anytime. TTCOM™ may be implemented as a hierarchical master/slave protocol at the application level, if desired.

According to another embodiment, Bluetooth™ is used as the wireless communication transport agent.

In operation, each vnode 23 receives command or other data through ad hoc network 20, one instance of which is shown in FIG. 2. For example, command data may be transmitted through VGATE 22 to piconets 21. The data is passed through the various piconets 21 until it arrives at the piconet 21 which contains the destination vnode 23. Network 20 can also be used to collect information from vnodes 23. For example, as will be explained in more detail below, vnodes 23 may comprise devices that are designed to collect data. Collected data may be passed through the various piconets 21 until arriving at VGATE 22. From VGATE 22, collected data may be passed to a private or public computer network, such as system 26. Alternatively, data arriving at VGATE 22 may be passed to VNOC 25 where it can be uploaded to, for example, system 26, via a variety of wireless communication methods as will be explained in more detail below.

Vnodes 23 comprise individually addressable entities enabled for wireless communication. Vnodes 23 can be originators, recipients or routers of data. According to one embodiment, each vnode 23 has its own IP address so that commands can be sent to and data can be collected from individual vnodes through VGATE 22. As will be explained in more detail below, VGATE 22 may be a computer gateway that enables communications between public or private computer networks 26 and network 20. According to one embodiment, vnodes 23 maintain a routing table with information about two separate groups of entities. The first group comprises vnodes 23 that are potential gateways for this vnode. Typically, one of the vnodes in this list has an acknowledged active route to a gateway such as VGATE 22. According to one embodiment, this route is stored in non-volatile memory so that a vnode may attempt to establish a connection with VGATE 22 without going through the self-configuration process described below. The second group comprises vnodes 23 that have a confirmed route to a gateway using this vnode as an intermediate hop. The concept of hops to a gateway is explained in more detail below in conjunction with the self-configuring process.

According to one embodiment, a vnode 23 comprises a device enabled for wireless communication using the Bluetooth™ protocol. According to this embodiment, vnode 23 may communicate with any other Bluetooth™ enabled device. For example, in one particular embodiment, a vnode 24 comprises a meter enabled for wireless communication using the Bluetooth™ protocol as explained in conjunction with FIG. 1. According to other embodiments, a vnode 23 may comprise a vending machine, an alarm system or electric distribution equipment.

As explained in the Bluetooth™ Specification, Bluetooth™ uses a number of multiplexed communication channels to communicate between devices. Each channel comprises a slightly different transmission frequency. According to the embodiment of network 20 shown in FIG. 2 in which each of vnodes 24 comprises a Bluetooth™ enabled device, two of the Bluetooth™ communication channels may be reserved for data passing between piconets 21. One channel can be used for upstream communication and the second channel can be used for downstream communication. In this way, upstream communication and downstream communication may be handled simultaneously. When data is passed between two piconets 21 in one direction, the vnode 23 of the piconet 21 that is engaged in the communication can determine if there is data to be passed in the other direction and may pass any such data off to the vnode 23 from which it received data. The use of other wireless communication protocols is possible.

Piconets 21 are operative to relay data to and from a central collection point through VGATE 22 using the wireless communication capabilities of vnodes 23 explained above. Piconets 21 may comprise, for example, ad hoc wireless networks of up to eight vnodes 23. Each vnode 23 in a piconet 21 at any instant of time knows about the existence of the other vnodes 23 that are connected to the piconet 21. In particular, each vnode 23 may know the identities (e.g., the IP address) of the other vnodes 23 and the type of data at the other vnodes 23 that are connected to piconet 21. This facilitates the above-described passing of data to and from the individual vnodes 23 and among piconets 21. More specifically, communications between piconets 21 need only take place through one of the vnodes 23 in a piconet 21 to one of the vnodes 23 in another piconet 21. According to another embodiment, any other suitable number of vnodes may be used to form piconets 21 given the limits of the communication protocol being used and the hardware.

As schematically depicted in FIG. 2, each of the rows of vnodes 23 may form a piconet 21. Data passing through the network 20 "hops" from one piconet 21 to another piconet 21 via wireless connections as shown in FIG. 2. These wireless connections are depicted at a particular instant in time and may change as piconets 21 are reconfigured. Data travels until it reaches the appropriate destination which may be VGATE 22 for data traveling upstream or one or more of vnodes 23 (or another Bluetooth™ enabled device) for data traveling downstream.

Because data sharing takes place among the various vnodes 23 of a piconet 21, network 20 of the present invention may also include security measures to protect the data of each vnode 23. According to one embodiment, the IP address of each vnode 23 comprises an encryption key that is used by each particular vnode to decode incoming data. The same encryption scheme may be used to encode all outgoing data from any vnode 23 as well. In this way, although each vnode 23 of a piconet 21 has access to the data for each of the other vnodes 24 of a piconet 21, the data is in encrypted form. Thus, the data is unreadable to the other vnodes 23 of the piconet 21.

Returning to FIG. 2, VGATE 22 operates to manage network 20. As manager of network 20, VGATE 22 may comprise both a communication gateway and an administrator for network 20. As a communication gateway, VGATE 22 comprises a gateway that enables wireless network 20 to communicate with a private computer network or a public computer network such as the Internet. According to one embodiment, VGATE 22 comprises a standard computer gateway enabled for Bluetooth™ communication. According to this embodiment, VGATE 22 may communicate with network 20 wirelessly using the Bluetooth™ protocol. Further, VGATE 22 may communicate with a public or private computer network using conventional means (wired communication). In operation, VGATE 22 can receive information, such as control data, from a private computer network and retransmit that information to any of vnodes 23 through network 20 using the Bluetooth™ protocol. Further, VGATE 22 can receive data from any of vnodes 23 via network 20 using the Bluetooth™ protocol and then retransmit that information through a private computer network. Other embodiments of VGATE 22 are possible.

According to another embodiment, VGATE 22 may be enabled to communicate using a number of separate wireless devices. Thus, the number of vnodes 23 that any VGATE 22 may act as a gateway for is increased. According to one embodiment, VGATE 22 is equipped with two or more Bluetooth™ chips and its capacity is at least doubled.

VGATE 22 may also act as an administrator for network 22. Specifically, VGATE 22 may comprise intelligence about the configuration of network 20. According to one embodiment, VGATE 22 comprises an intelligence module that contains the geographic location of all vnodes 23 within a certain distance of VGATE 22 and a list of all vnodes 23 that are presently communicating with VGATE 22. This is useful for example for locating specific vnodes 23, for example, for service purposes. For example, assume each vnode 23 represents a utility meter 21 in a residential neighborhood. If one of the meters 21 is not functioning properly, a repair person can determine the location of the vnode 23 from VGATE 22. Alternatively, if a repair person is driving through the neighborhood, that person can connect to network 20 using the self configuring process (explained below) as a vnode 23 would. Once connected, the repair person can use VGATE 22 to locate the non-functional vnode 23.

Although only a single VGATE 22 is shown in FIG. 2, network 20 may comprise a number of VGATES 22. Because VGATE 22 acts as a communication hub for network 20, the number of VGATES 22 in any network 20 will depend upon the bandwidth available. As described above, when data is passed through each piconet 21, it is determined whether additional data is to be passed. Thus, when data is passed through each piconet 21, additional content may be added to the data being passed. Therefore, to help ensure that the bandwidth limitations of the communication protocol are not exceeded, a sufficient number of VGATES 22 are deployed through a network 20.

Figure 3:
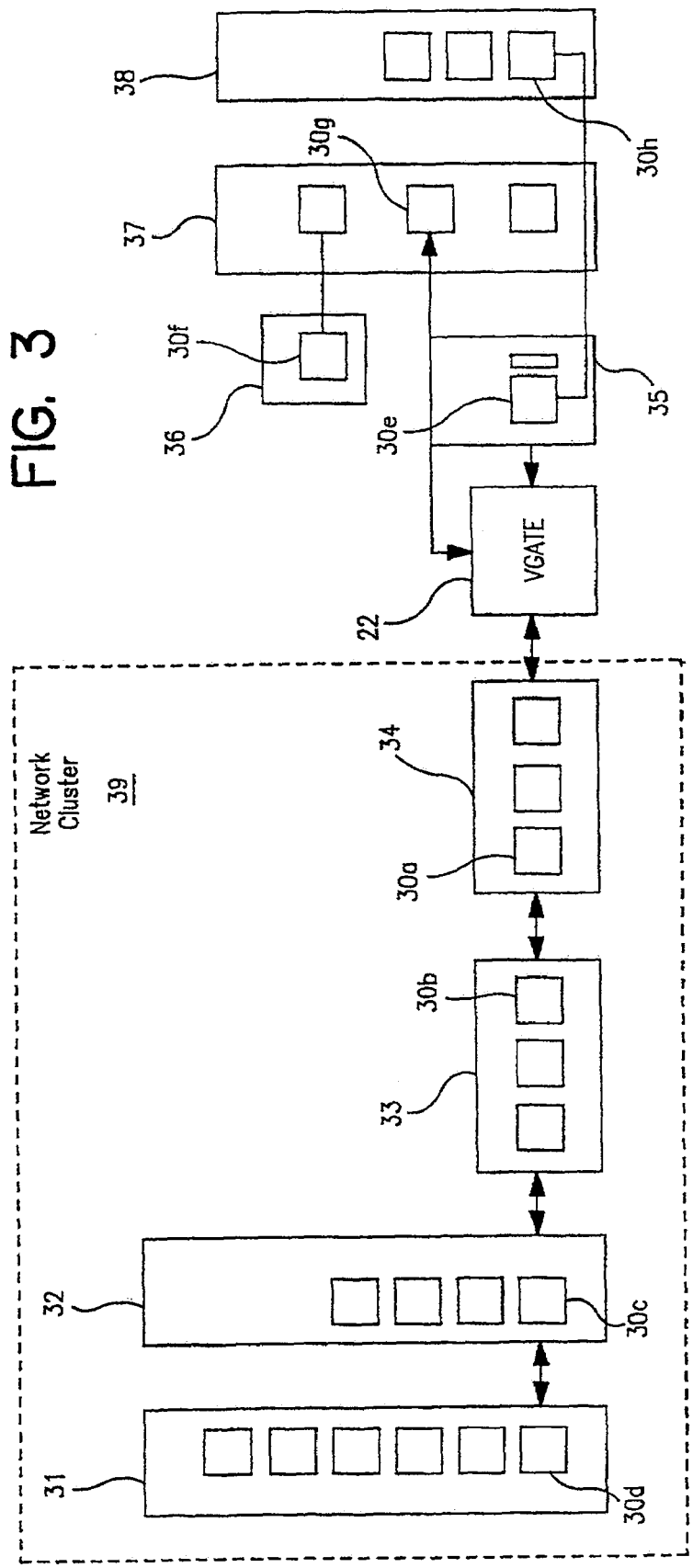
FIG. 3 is a schematic depiction of a self-configuring wireless network according to another embodiment of the present invention.

In another embodiment, shown in FIG. 3, at least two networks 31-37 may be daisy chained together to form a network cluster, such as network cluster 39. For example, each network 31-38 may represent a separate building. Thus, each building network 31-38 may be connected to another building network through individual vnodes 30a-30h. In this embodiment, the network cluster may be connected to one VGATE 22.

Thus, a first network 34 may be connected to a first VGATE 22 and a second network 33 may be connected to the first network by connecting a first vnode 30a in the first network to a second vnode 30b in the second network. Additional networks 31, 32 may be added to the network cluster where each network 31-34 communicates with the first VGATE 22 through the network cluster connections (i.e. network 31 communicates to VGATE 22 through networks 32, 33 and 34 while network 34 communicates directly with VGATE 22).

In another embodiment, networks 31-38 need not create a daisy chain path to communicate to a VGATE 22 through the geographically nearest network. For example, a network 38 may communicate to a VGATE 22 through a network 35 although network 3D is not the geographically nearest network to network 38.

In a further embodiment, the direct path formed from the VGATE 22 to a vnode 30a-h or network 31-38 need not be from the VGATE 22 to the nearest vnode 30a-h or network 31-38. For example, network 37 may form a direct path to VGATE 22 through vnode 30g although network 37 is not the geographically nearest network to VGATE 22.

Referring to FIG. 2, system 26 may comprise a central controller. VGATE 22 may facilitate connection to a central control controller 26. According to one embodiment, where vnodes 23 comprise utility meters 21, a utility company may read the meters 21 remotely and control utility usage by communicating with network 20 through VGATE 22. The central controller in this embodiment may be the computer network of the utility company. According to another embodiment, vnodes 23 may comprise vending machines and a management company can monitor stock in the vending machines by communicating with the machines through network 20 using VGATE 22. In this embodiment, the central controller may be the computer system for the management company. In another embodiment, VGATE 22 may facilitate communication between a monitoring company and a network of alarm systems when vnodes 23 are residential or commercial alarm systems. In still another embodiment, VGATE 22 may facilitate communication between an electric generation company and its distribution equipment that are enabled to communicate using a wireless communication protocol.

Returning to FIG. 2, network 20 may also connect with other devices. FIG. 2 depicts network 20 connecting with VNOC 25 and other devices 24 that are enabled for wireless communication. Each is explained in more detail below.

As discussed above, VGATE 22 facilitates communication between network 20 and other public or private computer networks using, e.g., conventional wired networking. In contrast, VNOC 25 comprises a virtual network operation center. According to one embodiment, VNOC 25 comprises a universal communication adapter that is enabled to transmit and receive using a variety of communication protocols and media. VNOC 25 is capable of communicating using RF, cellular, microwave, satellite and other communication protocol. According to one embodiment, VNOC 25 communicates with VGATE 22 in order to facilitate communication between network 20 and other non-wired networks. For example, VNOC 25 can receive command data for network 20 via satellite communication and retransmit the command data to VGATE 22 for distribution to vnodes 23. According to one particular embodiment, VNOC 25 comprises the VNOC system sold by Telemetry Technologies, Inc.

According to another embodiment, VNOC 25 may communicate directly with vnodes 23. In this embodiment, VNOC 25 is enabled for communication using the Bluetooth™ communication protocol. For example, VNOC 25 may receive command data for any of vnodes 23 via any of its enabled communication protocols. VNOC 25 may then retransmit the command data to the appropriate vnode using the Bluetooth™ protocol. Conversely, VNOC 25 may receive collected data from one or more of vnodes 23 via network 20 using the Bluetooth protocol and then retransmit the collected data to another location using an appropriate one of its enabled communication protocols. Accordingly, VNOC 25 enables communication with devices forming part of network 20 using a number of different communication protocol or media. VNOC 25 is especially useful for networks 20 installed in remote or rural areas where hard wire connections are uneconomical. A detailed description of VNOC 25 is provided in conjunction with FIGS. 7-12 below.

Network 20 may also connect with other devices 24. These other devices 24 are similar to vnodes 23 in that they are enabled for wireless communication. According to one embodiment, these other devices 24 are dissimilar from vnodes 23 in that they do not have the capability to connect as members of piconets 21. These other devices 24 are able to communicate through network 20 by connecting to a vnode 23 as shown in FIG. 2. According to one embodiment, these other devices may comprise devices that are enabled to communicate using the Bluetooth™ protocol. In a particular embodiment, these other devices may comprise thermostats, pool pumps, and other household devices (refrigerators, washers, dryers, electronics) that are enabled to communicate using the Bluetooth™ protocol. According to another embodiment, these other devices are enabled to form piconets 21 and act as vnodes 23.

According to one embodiment, network 20 is formed by deploying utility meters that are enabled for wireless communication throughout a neighborhood. The utility meters act as vnodes 23 to establish the infrastructure of network 20. Once network 20 is deployed, it may be used to control other household devices such as pool pumps, thermostats and appliances (other devices 24) that are also enabled for wireless communication. According to one particular embodiment, Bluetooth™ enabled meters are deployed throughout a neighborhood to form the infrastructure for network 20. Network 20 is then used to communicate with other Bluetooth™ enabled devices in the neighborhood.

Figure 4:
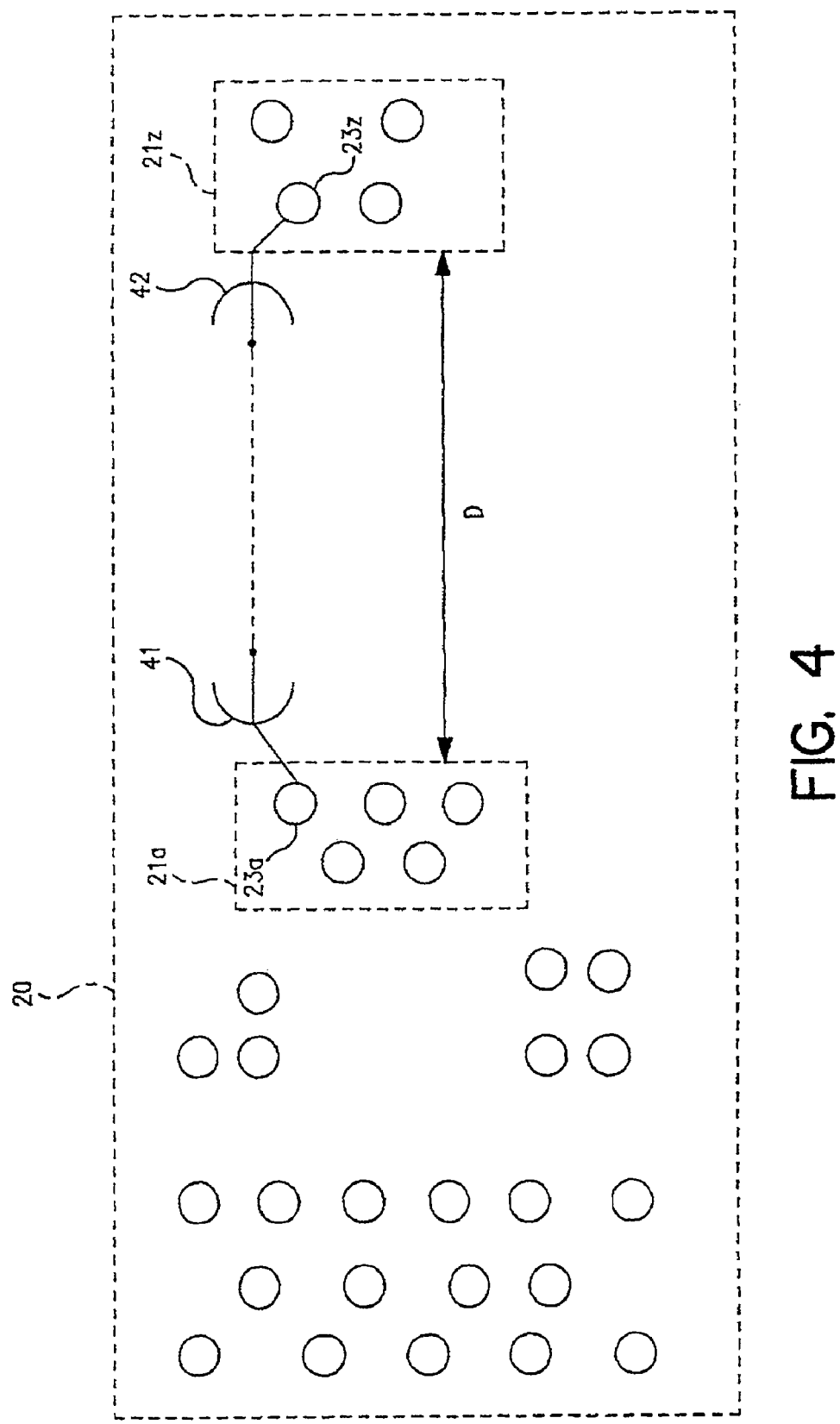
FIG. 4 is a schematic depiction of a self-configuring wireless network according to another embodiment of the present invention.

In another embodiment, shown in FIG. 4, the network 20 may be a wide area network to optimize communication in rural areas. Network 20 may include piconets 21a, 21z. As shown, piconet 21z is a distance D from its geographically nearest piconet 21a in network 20. High gain, directional antennas 41-42 may be used to provide a line of sight point to point connection between vnode 23a of piconet 21a and vnode 23z of piconet 21z. Antennas 41-42 form fixed links, and boost decibel gain and power in the network 20. Use of antennas 41-42 to form connections between vnodes 23a, 23z allows the range from the Bluetooth™ equipment to be increased to at least approximately 17 miles.

As discussed in the background, conventional wired networks suffer from drawbacks such as physical disruption. One advantage of the embodiments of wireless network 20 discussed above is that it does not depend on wired connections. Another advantage of wireless network 20 discussed above is its self configuring nature. Therefore, if there is an interruption in the network structure, the network can reconfigure itself. More specifically, each of vnodes 23 is programmed to periodically poll the other vnodes 23 of its piconet 21 to determine that piconet 21 is still intact. If a vnode 23 determines through its regular polling routine that it is no longer connected to a piconet 21, it performs a self-configuring cycle in which it looks for another piconet 21 to join.

The self-configuring cycle of a vnode 23 within network 20 is based on a number of rules. One example of such a rule is that a vnode 23 in search of a piconet 21 will only connect with a piconet 21 that is in search of a vnode 23. As another example, each vnode 23 within network 20 may be programmed with a maximum of hops that it can use in order to reach a communication point (VGATE 22 or VNOC 25). The maximum number of hops for any vnode 23 is preferably based on geography. That is, when a vnode 23 is deployed, it may be programmed with information concerning the geographic location of the closest uploading point. Therefore, by rule, when a vnode 23 goes through its polling routine, it can be instructed not to connect to any piconet 21 if the connection would result in a maximum number of hops to a VGATE 22 or VNOC 25 equal to, or greater than, its maximum number of hops. Moreover, a vnode 23 may be programmed to connect to a piconet 21 that has the smallest number of hops to an uploading point. As still another example of a self-configuring rule, when a vnode 23 is looking for a piconet 21 to connect with, it may be programmed to connect with piconets 21 that have connections to two or more other piconets 21. In this way, a measure of redundancy can be built into self-configuring network 20. Other rules are possible and are within the skill of the ordinary artisan.

According to another embodiment, any particular vnode 23 may connect with multiple networks 20 at any given instant in time. As explained above, according to one embodiment, self-configuring network 20 utilizes two communication channels available within the Bluetooth™ communication protocol for upstream and downstream communication. According to another embodiment, however, multiplexing is used in conjunction with those two communication channels allowing each vnode 23 to be part of a number of different networks 20 at the same time.

Figure 5:
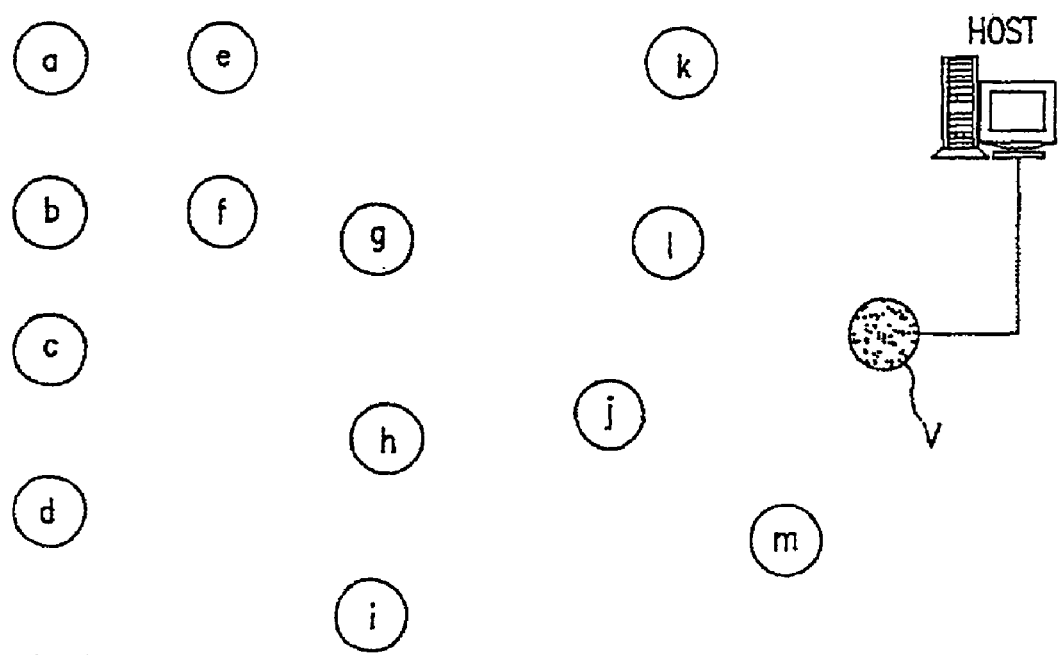
FIG. 5 is a schematic diagram showing a self-configuration process according to one embodiment of the present invention.

With reference to FIGS. 3-6, an example of self configuration of network 20 will now be given. For the example shown, it will be assumed that all vnodes 23 in network 20 are UNCONFIGURED (represented by white circles). The circles in FIGS. 5-8 represent either individual vnodes 23 or piconets 21. As shown in FIG. 5, in the first step when vnodes 23 bootup, they wait a pseudo-random amount of time (to avoid network flooding after a global power down) before broadcasting a request for a VGATE. The vnodes then wait for a valid response from other vnodes to setup their routes. If no valid response is received, the request message is again broadcast after a pseudo-random delay. This process is repeated till a valid response is received from another vnode 23. During this time if the vnode 23 receives a message from a VGATE it stops broadcasting the request message and stores the transport-agents parameters for access to the VGATE 22 in its routing table. In the example shown, as vnodes a-m are broadcasting requests for a VGATE, VGATE v may be broadcasting a message identifying itself as a VGATE.

Figure 6:
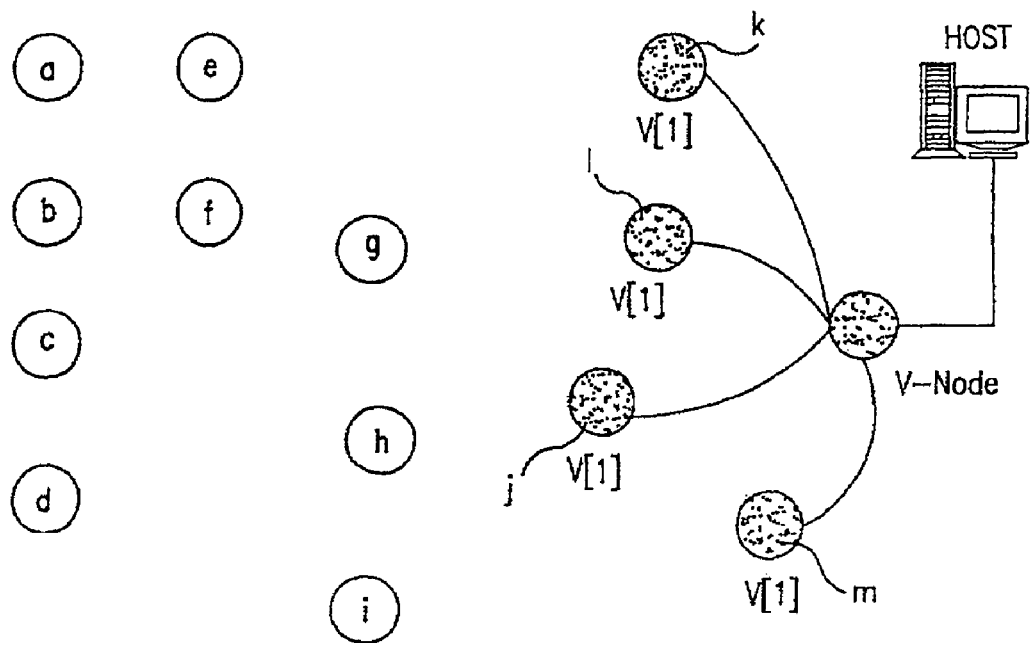
FIG. 6 is a schematic diagram showing a self-configuration process according to one embodiment of the present invention.

As shown in FIG. 6, in the next step of network configuration, vnodes j, k, l and m successfully receive a message being periodically broadcasted by VGATE 22. These vnodes 23 update their routing tables and stop broadcasting the request message. These vnodes are now configured with a zero metric. The metric indicates that these vnodes 23 have a direct link to VGATE 22.

Vnodes a-i may continue broadcasting request messages after pseudo-random delays. VGATE v may continue broadcasting a message identifying itself as a VGATE.

Figure 7:
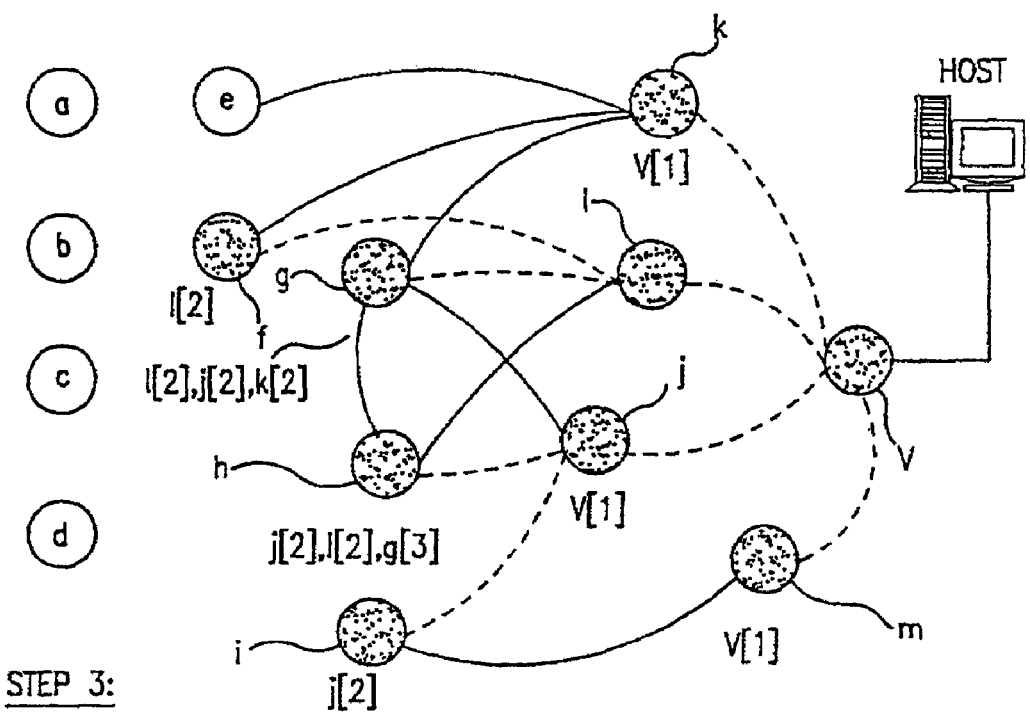
FIG. 7 is a schematic diagram showing a self-configuration process according to one embodiment of the present invention.

Now, some of the vnodes 23 that have a route to the VGATE 22 configured, receive a request messages from unconfigured vnodes 23 and choose to respond with a message indicating their availability as a path to a VGATE v. The metric in their response is set to 1. For example, vnodes j-m may respond to vnodes e-i. Vnodes 23 which receive this response message can choose to update their routing table with the new path. On the other hand, if the metric, usage or transport-agent provided parameter (e.g. radio signal strength) is unacceptable the vnodes can simply discard the response and wait for responses from other vnodes. For example, vnode e receives a response from vnode k providing a route to VGATE v, but the metric is too high. This is illustrated in FIG. 7. In the example shown, vnodes f-i have multiple routes, based on metrics. The dotted lines represent discarded routes. The primary gateways may be sent acknowledgements.

Figure 8:
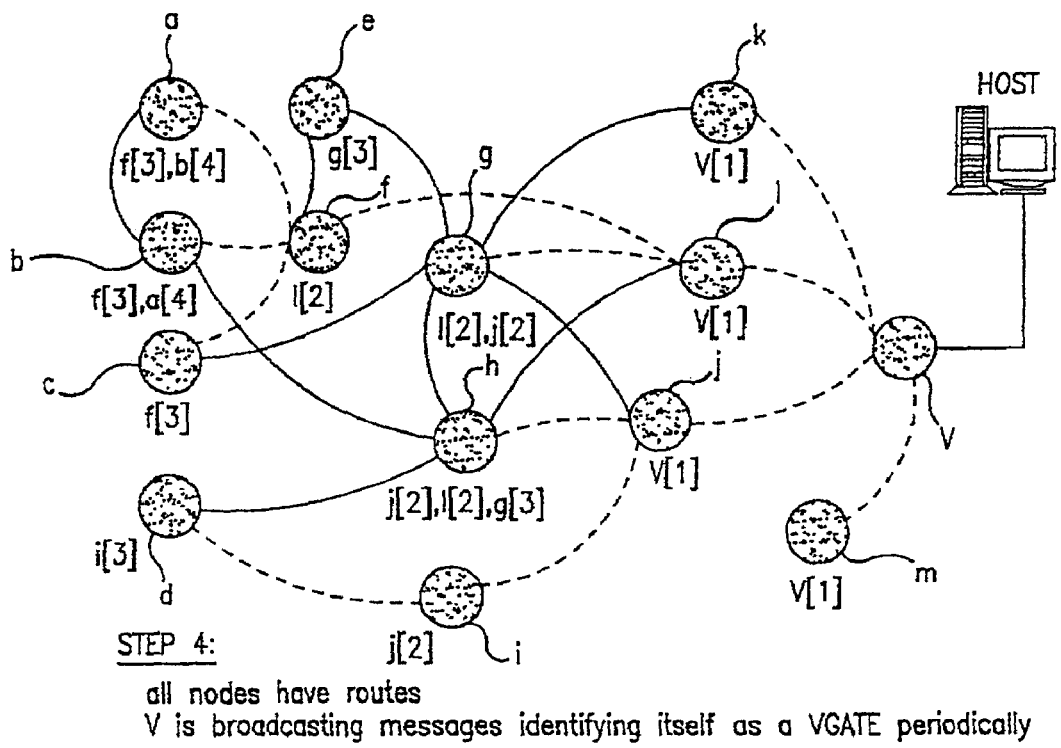
FIG. 8 is a schematic diagram showing a self-configuration process according to one embodiment of the present invention.

This process continues until all vnodes are configured. The completion of the configuration process is shown in FIG. 8. It should be noted that each of the vnodes shown in FIGS. 5-8 may represent individual vnodes 23 or the vnodes pictured may actually represent individual piconets 21. It should also be noted that any vnode a-m, not only the geographically nearest vnodes, may connect directly to VGATE v. For example vnode d may be directly connected to VGATE v.

When undergoing this self-configuration process, vnodes establish connections with each other. According to one embodiment, these connections are established between two vnodes using a three step handshake. For example, assume a connection is being established between vnode X (desiring a route) and vnode Y (providing a route).

Step 1 vnode X broadcasts request for route to VGATE.

Step 2 vnode X possibly receives multiple replies from various vnodes. It chooses vnode Y to be its Gateway (based on metric and transport-agent parameters).

Step 3 vnode X acknowledges to vnode Y confirming that Y is now the Gateway for X.

Once this route has been established, X and Y are able to exchange messages and depending on the transport agent periodically check each other for messages to be exchanged. In case there is an error (a vnode fails, or communications fails) it is then the responsibility of vnode X to find another route by sending out a request. A vnode can explicitly send a message to a VGATE requesting a deletion of a route by sending a message.

Data propagation through network 20 will now be explained in more detail. Data propagates through network 20 in individual packets. According to one embodiment, packets to be sent to VGATE 22 have a destination of zero. The vnode 23 that originates the packet sends the packet through its gateway path vnode to vnode until the packet reaches VGATE 22. Each vnode 23 processing the packet decrements the address of the packet. If the address reaches zero, the packet is discarded. This is a mechanism to avoid looping packets in circular paths. As the packets pass through each vnode 23, an entry is made in the packet to record the route of the packet. The route is stored in VGATE 22 and provides a path for data directed from VGATE 22 to the vnode 23.

A packet exchange between nodes can be done in an acknowledge or non-acknowledge mode. Sending data in an acknowledge mode helps ensure that the packet is delivered to its intended recipient. According to one embodiment, acknowledgements are piggybacked on other data traveling through network 20 to reduce network traffic.

If a packet delivery fails, e.g., due to a vnode 23 failure, the vnode 23 delivering the packet starts a new search for a path to VGATE 22 by sending out a request, just as if it was a new vnode 23. Additionally, it should be noted that a VGATE 22 can delete a route at any time, e.g., to preempt excess traffic problems. VGATE 22 typically does not terminate any packet delivery until receiving acknowledgements from all vnodes. A vnode may search for a path to a VGATE 22 at any time, even if it is configured. This enables a vnode 23 to search for a more efficient path and thus enables the network to fine tune itself. As stated above, vnodes 23 may store a preferred route in non-volatile storage and attempt to establish this route directly without searching for a link.

As explained above, network 20 comprises a three layer network on top of an existing transport agent such as Bluetooth™. According to another embodiment, one or more additional layers may be added. According to one particular embodiment, a layer may be added to form networks between various VGATES 22. This layer would enable, among other things, the capacity of network 20 to be increased.

VNOC 25 will now be explained in conjunction with FIGS. 9-14. Typically, the VNOC system is intended to provide seamless service for the customer. For example, the following description of one embodiment of the VNOC system is provided with reference to a remote water meter controller. The water metering customer has a remotely located water supply implementing a remotely controllable water metering valve. The customer desires to control the metering valve, monitor its status, and collect other data pertaining to the valve (e.g., daily throughput, average water temperature, or other data). If a particular circumstance should occur (e.g., the water flow drops below a predetermined level), the water valve meter sends a signal in whichever format the remote controller implements (e.g., cellular, wireline, Internet, or other format). The VNOC system provides the interface to receive data from the remote valve in that format and records the occurrence of an incoming event. The VNOC translates the incoming event into the outgoing event format (or formats) pre-selected by the customer. If the incoming event is one that the customer designated as requiring notification, the selected notification report is sent to the customer over the appropriate customer interface (e.g., facsimile, pager, email, etc.).

If desired, the customer can take appropriate action through a customer interface. For example, the customer may send a command to the remote valve (e.g., open until the flow rate reaches a certain level). Such a command may be sent through the customer interface (e.g., inputting a code through a telephone tone/number sequence, inputting a command into a web browser, or other method). The VNOC receives the command from the customer and records another incoming event. The VNOC then translates the customer incoming event into the proper network outgoing event format and sends the command to the remote valve for implementation.

Figure 9:
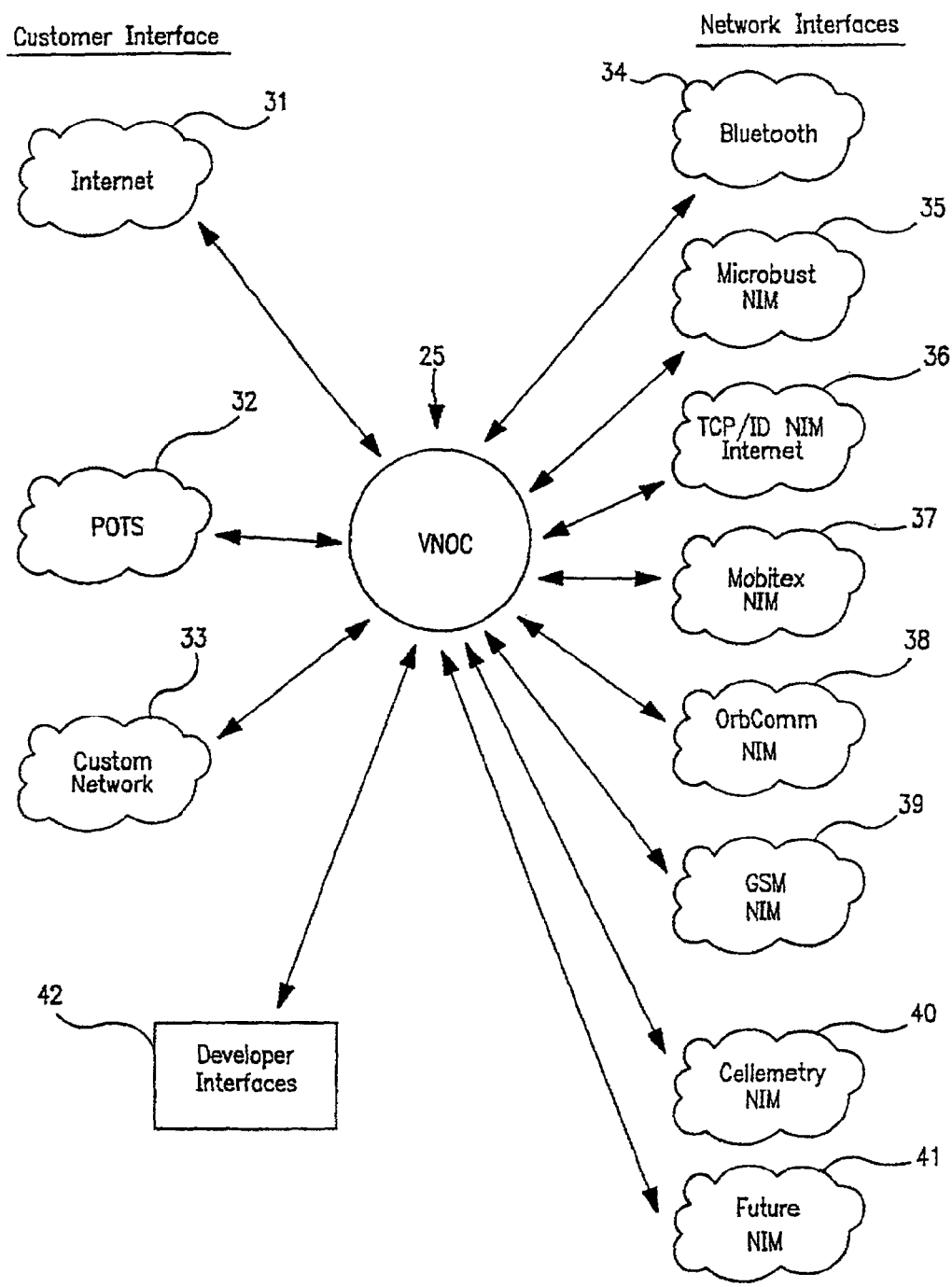
FIG. 9 is a schematic representation of the system for an embodiment of the invention.

FIG. 9 is a schematic representation of VNOC system 25 communicating between various customer facing interfaces and network facing interfaces. Customer interfaces may comprise any suitable interface over which a customer may communicate with the monitoring or control device. For example, customer interfaces may comprise computer interfaces such as a web browser, an electronic mail (email) interface, or a custom Internet protocol (IP) application. Customer interfaces may also comprise telephone interfaces such as a modem, an IVR, a facsimile machine, and a pager. Customer interfaces may also comprise custom interfaces such as a control and monitoring host, for example, a supervisory control and data acquisition ("SCADA") host. Other customer interfaces are possible.

The various customer interfaces communicate with VNOC 25 over an appropriate network. For example, computer related customer interfaces (e.g., web browser, email interface, or custom IP application) communicate with VNOC 25 over a computer network 31 such as the Internet or a local intranet. Other computer networks (WANs, LANs, etc.) are possible. Similarly, telephone related customer interfaces (e.g., modem, IR, fax machine, or pager) communicate with VNOC 25 over a telephone network 32 and custom devices communicate with VNOC 25 over a suitable custom network 33 (e.g., X.25, VSAT, SCADA, wireless, etc.).

The various network facing interfaces communicate with VNOC 25 over an appropriate network. The communication may be accomplished over typical wire line, wireless, or other network. For example, VNOC 25 communicates with network facing interfaces using Bluetooth™, cellular, satellite, interconnected computer (i.e., the Internet), or other networks. VNOC 25 communicates over networks with various third party network services. For example, VNOC 25 may communicate with third party network services such as Bluetooth™ 34, MicroBurst 35, the Internet 36, Mobitex 37, OrbComm 38, GSM 39, Cellemetry 40 and other future networks 41. The various third party network services may communicate with various I/O devices. The I/O devices enable monitoring and control of various systems. Monitoring and control may be implemented by any suitable input or output. For example, input and output may comprise digital, analog, AMR, or other signal formats.

Developer interfaces 42 may also communicate with VNOC 25. The developer interfaces 42 may be used by customers or others to enable other desired programs and applications. For example, developer tools such as Java/Bean, ODBC/SQL, OPC, LIB/DLL, ActiveX, COM, DCOM, ORB, and others, may be used to adapt telemetry applications in communication with VNOC 25.

Figure 10:
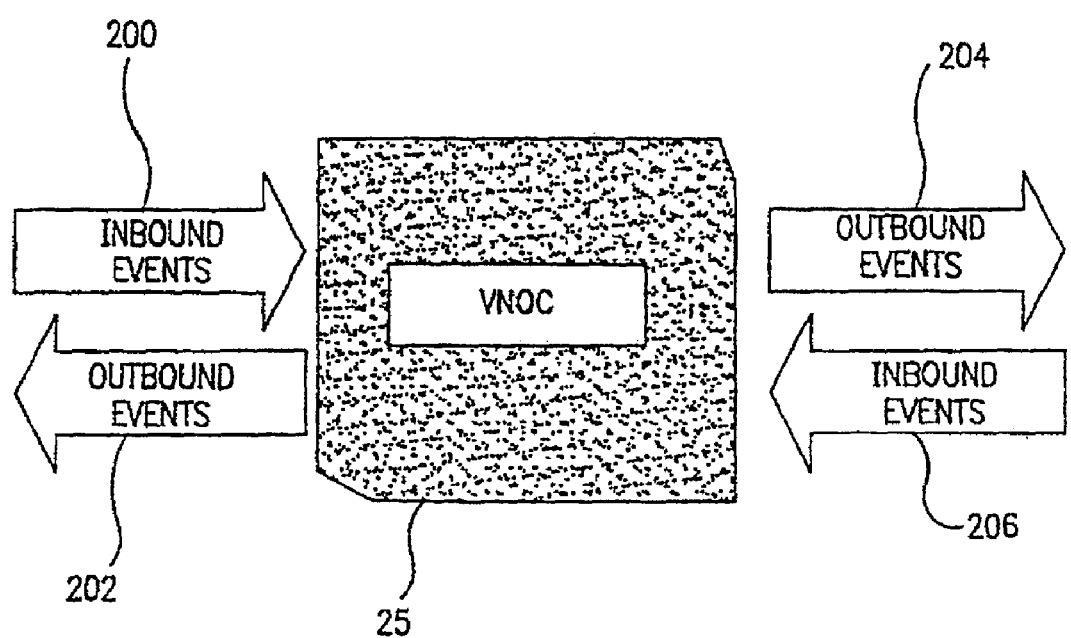
FIG. 10 is a black box representation of an embodiment of the invention.

As shown in FIG. 10, the various customer and network interfaces communicate through the transmission of events through VNOC 25. Inbound events may originate at the customer interface (e.g., inbound event 200), or the network interface (e.g., inbound event 206). These inbound events are processed into corresponding outbound events (e.g., outbound events 204 and 202). As noted above, events correspond to occurrences (or the lack of an occurrence) preselected for customer monitoring. In other words, the events are situations for which the customer desires to be notified. Thus, events may comprise physical occurrences (eg, a meter records a certain value, a pre-selected inventory item is shipped, etc.) or other less tangible occurrences (e.g., a preselected stock price is reached, a certain sales volume is reached, a particular email message is received, a particular time period has expired, a dat file has been transferred, a point-to-point message is received, etc.).

Figure 11:
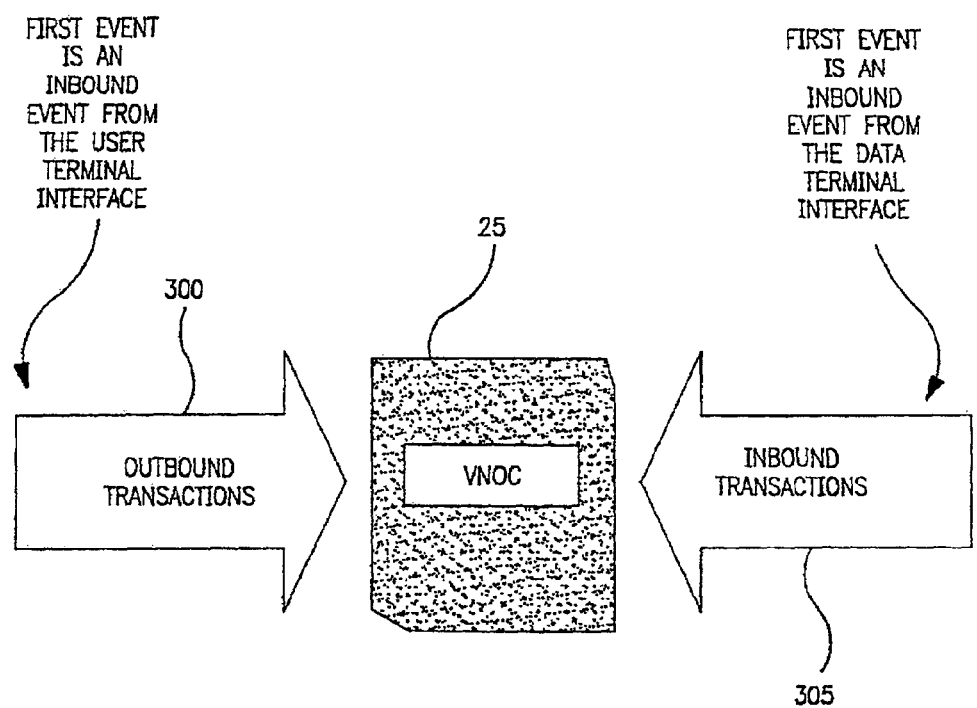
FIG. 11 is a black box representation of another embodiment of the invention.

For certain events a customer may desire notification. Such notification may comprise a report sent to the customer in a pre-selected format (or formats for multiple reports). Other events may trigger other services. For example, some events may be set up to cause an automatic response from VNOC 25 (e.g., if a predetermined meter safety reading is exceeded, then automatically shut down the I/O device). Other services are possible. Reports and services associated with an event may be collectively considered as transactions. As shown in FIG. 11, transactions may be inbound 300 or outbound 305. Such a configuration enables the reporting and processing of event data using a publish/subscribe paradigm. Reports and services triggered by an event may be handled as a single transaction.

Figure 12:
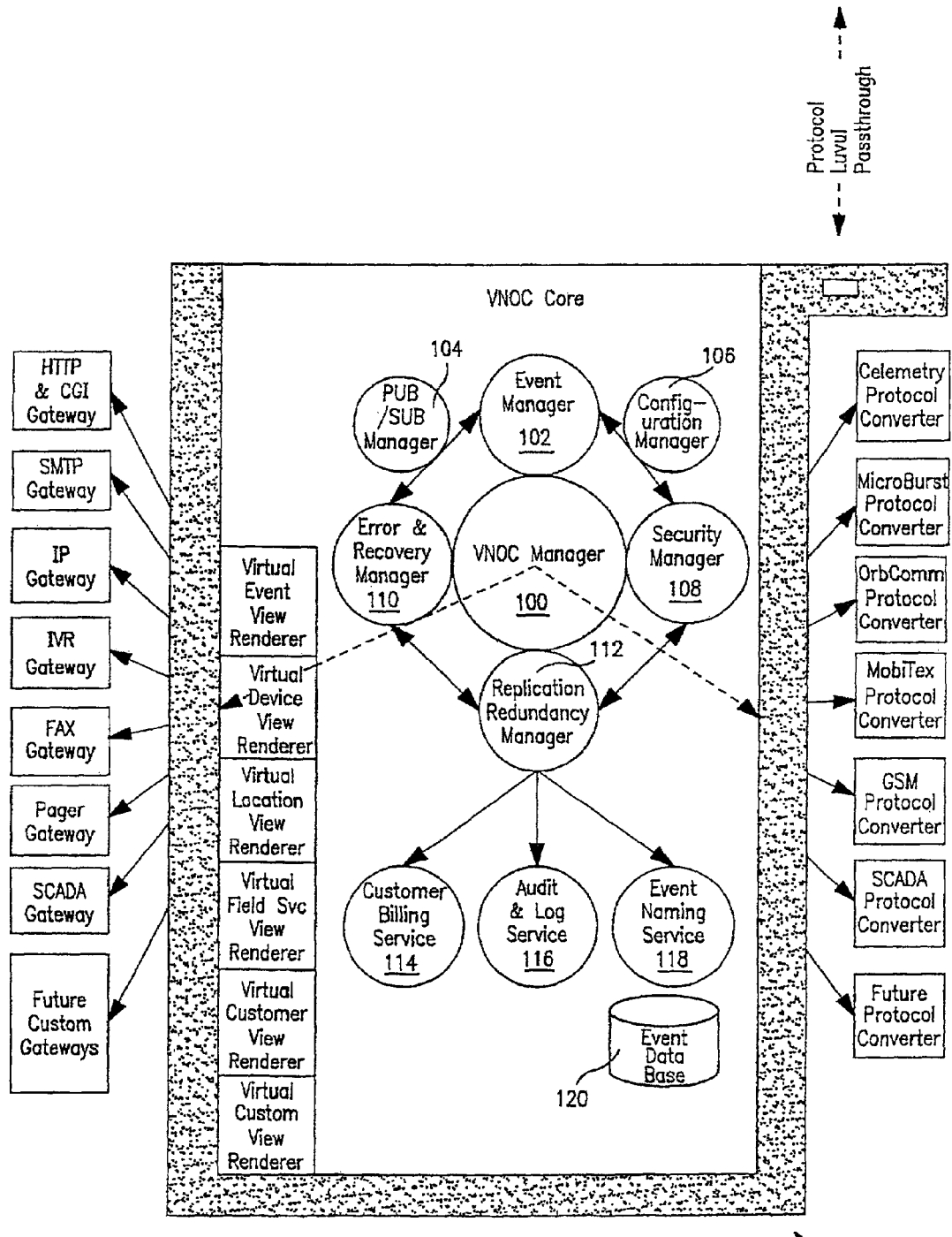
FIG. 12 is a schematic representation of components of the system for an embodiment of the invention.

FIG. 12 is a schematic representation of internal structure of VNOC 25. VNOC manager 100 manages communication between customer interfaces and network interfaces. Event manager 102 enables the management of events passing through VNOC 25. For example, events such as incharge, onset to offload, dependencies, concurrence, and others may be managed by event manager 102. Publication/subscription manager 104 enables the management of customer subscription to, and network publication of events. Configuration manager 106 manages the configuration of various VNOC 25 components by enabling, for example, customer specification of interfaces, protocols, services and other criteria. Security manager 108 enables management of various security measures implemented in the VNOC system. For example, security measures such as access rights, revocation, auditing, and other security functions may be managed by security manager 108. Error and recovery management manager 110 enables the management of error detection and recovery from errors. For example, error and recovery functions such as, notification, logging, recovery, backups, secondary paths, and other functions may be managed by error and recovery manager 110. Replication redundancy manager 112 enables various replication features. For example, redundancies between machines and locations, hot failure switchovers, persistence, rollovers, and other replication features may be managed by replication redundancy manager 112. Customer billing module 114 enables, among other things, the tracking and billing of customer usage. For example, customer billing module 114 may manage the tracking of the level of usage, accumulation of bills, charges to third party interfaces, and other billing functions. Audit and log module 116 enables auditing and logging of various information. For example, location, levels, access, presentation, historical presence, and other information may be managed by audit and log module 116. Event naming module 118 manages the naming of events and may communicate with event database 120. For example, using an extensible markup language (XML) style event naming.

Figure 13A:
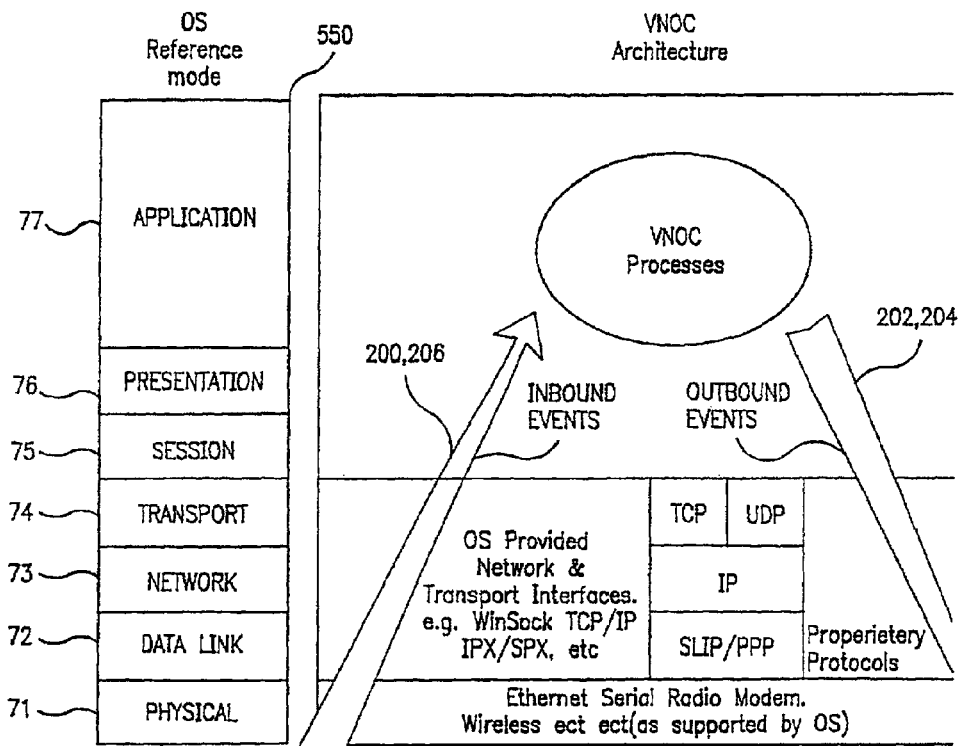
FIG. 13A is a schematic of an embodiment of the VNOC architecture for an embodiment of the invention.
Figure 13B:
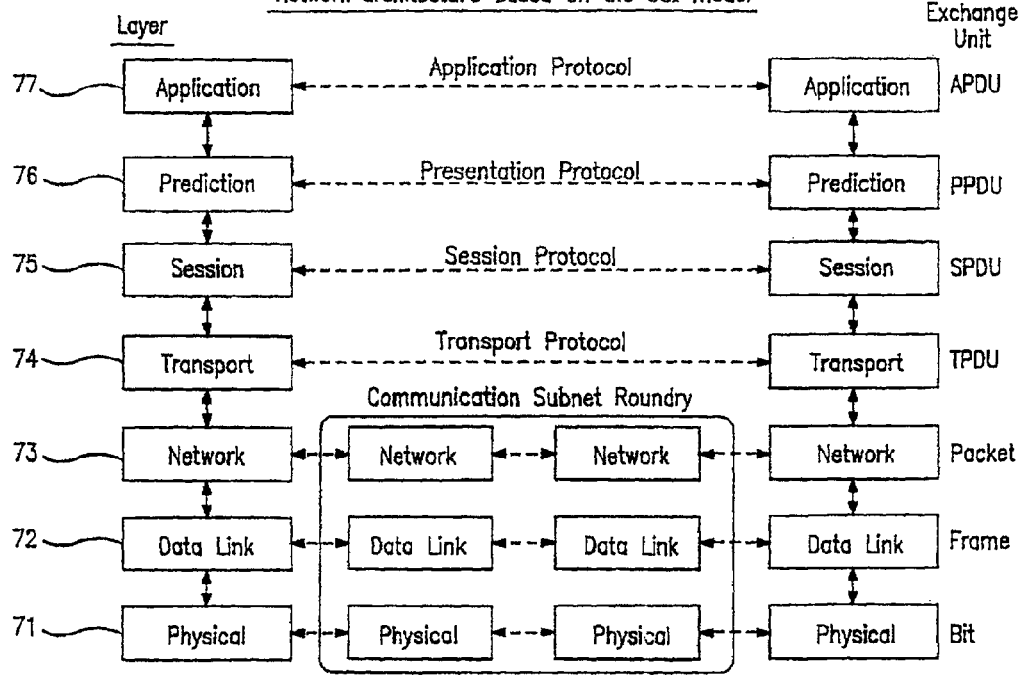
FIG. 13B is a schematic of an embodiment of network architecture.

FIGS. 13A and 13B represent an embodiment of the VNOC architecture. As shown in FIG. 13A, the VNOC architecture compares with the open systems interconnection (OSI) reference model network architecture. The OSI reference model 550 provides for various layers of network architecture (as shown in FIG. 13B). For example, the OSI layers may include a physical layer 71, a data link layer 72, a network layer 73, a transport layer 74, a session layer 75, a presentation layer 76 and an application layer 77. In an embodiment of the VNOC, physical layer 71 may comprise the various Ethernet, serial port, RF, modem, wireless, and other, physical connections as supported by the I/O device. Transport layer 74, network layer 73 and data link layer 72 may comprise the various protocols that make up the network and customer interfaces (e.g., WinSock, TCP/IP, IPX/SPX, UDP, SLIP/PPP, and other proprietary protocols). The session layer 75, presentation layer 76 and application layer 77 comprise the various VNOC processes described herein.

The VNOC architecture enables various features which provide for increased flexibility. For example, the VNOC system allows uniform representation of event data collected from a variety of I/O points, hand held devices, computers and networks. In addition, the reporting and receipt verification of events can be provided in any available customer protocol and interface. The symmetric design also provides for the customer to be an I/O point and provide an incoming event into VNOC 25. The VNOC architecture allows one user to connect to multiple I/O points, hand held devices or computers (one-to-many), multiple users to connect to one I/O point, hand held device or computer (many-to-one) and multiple users to connect to multiple I/O points, hand held devices or computers (many-to-many).

Additional features of the VNOC exist. For example, users are provided with simple and flexible interfaces, which they are accustomed to and, over which they can interact with their I/O points for feedback and control purposes. Furthermore, the VNOC allows users to query the system to retrieve desired data. Additionally, the VNOC provides the ability to summarize data at user specified level of detail and for user specified periods of time.

Figure 14:
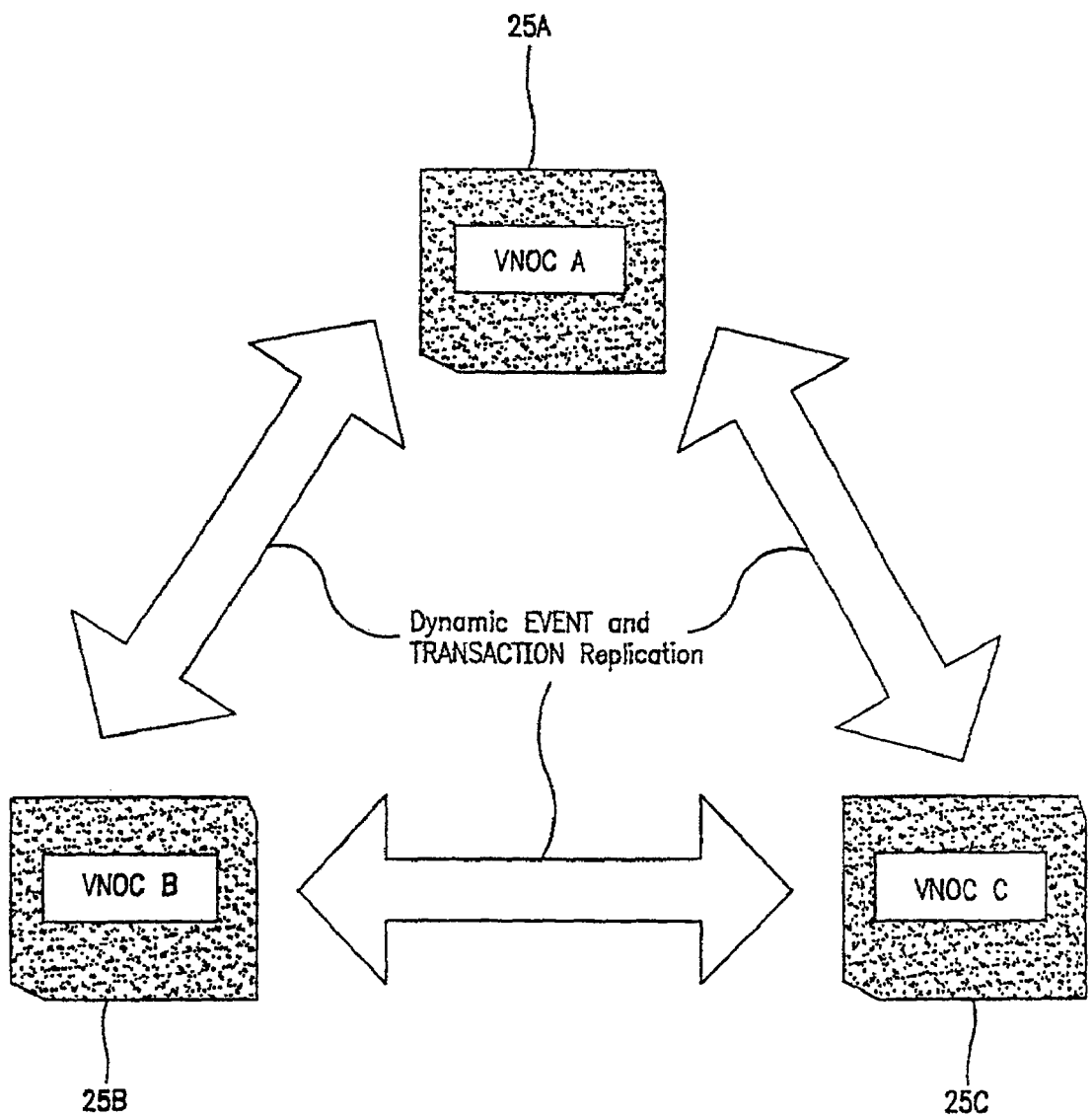
FIG. 14 is a black box representation of an embodiment of the invention employing redundant architecture.

FIG. 14 represents a schematic of an embodiment of the VNOC system. As shown, such an embodiment enables high availability of the VNOC by providing multi-redundant systems (e.g., VNOC 25A, VNOC 25B, and VNOC 25C). Other multi-redundant features (e.g., multi-redundant servers, connections, and geographic locations) also ensure reliability and availability of the VNOC system.

The VNOC remote monitoring system can be combined with other related technologies to provide more sophisticated notification and/or data collection systems. For example, two way pager notification can be employed as an add-on to the system. Also, integrated voice response can be employed in the system to enable the system to confirm that a particular notification has, in fact, been received by the proper personnel. Other features, such as fax on demand and web presence, can be employed to provide periodic information updates via fax or internet. This feature is particularly useful when a data collection center is collecting data from a plurality of remote monitoring systems (such as network 20 shown in FIG. 2) and compiling the data for analysis purposes. A variety of other technologies can be easily interfaced with the VNOC system to allow customization of each product to the user's needs. For instance, the system can be adapted for security monitoring and reporting applications to use, for example, the Mobitex PCS network for the transmission of video capture of intrusions or status of monitored area.

The systems explained in conjunction with FIGS. 1-4 and 9-14 can be employed in a variety of different applications which are suited for remote monitoring. For example, in addition to monitoring devices such as meters and wireless networks as discussed in FIGS. 1-4, the system of FIGS. 1-4 and 9-14 may be employed to monitor devices such as vending machines, drop boxes, sewer and water treatment facilities, flood control systems, railroad systems, waste management systems, environmental management systems, oil and gas pipelines, traffic systems, electric, gas and water utility systems, and medical alert systems. The system of FIGS. 1-4 and 9-14 may also be employed as part of a quality management system. Other applications will be apparent to persons skilled in the art.

The wireless communication capabilities discussed in FIGS. 1-4 and 9-14 of the present invention may be employed for the remote monitoring of vending machines such as food or beverage dispensing machines. For example, a remote monitoring system can be installed in or near a vending machine and connected to appropriate sensors to monitor such characteristics as power status, product inventory, available monetary change status and a variety of general dispensing functions to ensure that the vending machine is operating properly at all times. Sensors may be any conventional system for acquiring the type of data which is to be monitored. For example, many vending machines include electronic circuitry which acquires some or all of the data required by the remote monitoring system of the present invention. In such a case, it is only necessary to connect the electronic circuitry of the vending machine with the input/output and/or expansion ports of an appropriate interface and to include a wireless communication system such as a Bluetooth™ wireless system.

A main power module can be connected to the available power source for the vending machine for operation. When a remote monitoring system detects a problem with the vending machine, data indicating the type of problem, such as a malfunction or depletion of inventory, can be communicated to the appropriate source for action. This allows service personnel to be dispatched promptly when they are required. Moreover, with appropriate equipment, information about the cause of the problem can be communicated to service personnel to provide them with an idea of the situation that needs to be addressed. Thus, the vending machine can be promptly serviced, when required, and unnecessary visits to the vending machine can be eliminated.

The present invention may also be employed as part of a waste management system to monitor such things as the need for pick-up at a particular dumpster, the truck count at a dumpster and/or to determine whether a particular truck is full and needs to unload. This could be done by interfacing conventional sensors at dumpster sites with a wireless communication system such as the Bluetooth™ system. In this manner, trucks can be more efficiently deployed to make pick-ups where needed and to avoid unnecessary pick ups. This may permit a reduction in the number of trucks required to service a particular area and/or allow alterations of the size or placement of dumpsters to efficiently accommodate the need for same.

The present invention is also applicable to monitor various aspects of utilities including gas, electric and water utilities. For example, the meters in individual households can be replaced by, or upgraded with meters that are enabled for wireless communication such as the meters discussed in conjunction with FIG. 1. These meters provide remote reporting of utility usage to a data collection center. Further, water, gas and electricity distribution systems can be monitored using the present invention for both failure detection and to collect data useful to determine efficient ways to operate such distribution systems. Additionally, a variety of different key pieces of equipment employed by utilities can be monitored using the system of the present invention.

Other embodiments and uses of the invention will be apparent to those skilled in the art from consideration of the specification and practice of the invention disclosed herein.

What is claimed is:

1. A self configuring wireless network, comprising:
   (i) a group of virtual network nodes, each of said group of virtual network nodes supporting a wireless communication link, said group of virtual network nodes being capable of self configuring said group of virtual network nodes into an organized network via messaging between said group of virtual network nodes; and
   (ii) a gateway being communicatively coupled to said group of virtual network nodes and configured to provide a communication access point between said group of virtual network nodes and an external network, wherein access by an additional virtual network node, which is separate from said group of virtual network nodes, to said external network is facilitated by a route that includes a wireless communication link between said additional virtual network node and a first of said group of virtual network nodes and a path from said first of said group of virtual network nodes to said virtual gate defined by said organized network.

2. The self configuring wireless network of claim 1, wherein each of said group of virtual network nodes is configured to execute a self configuration cycle to establish said organized network.

3. The self configuring wireless network of claim 2, wherein said self configuration cycle is executed upon initialization and/or upon a detected disruption in connectivity.

4. The self configuring wireless network of claim 2, wherein said self configuration cycle includes a determination of whether a number of hops to said virtual gate exceeds a maximum number of hops.

5. The self configuring wireless network of claim 2, wherein said self configuration cycle includes an examination of a measure of redundancy in connections.

6. The self configuring wireless network of claim 2, wherein said self configuration cycle includes a determination of whether a connection is made only to a group of virtual network nodes that is searching for another virtual network node.

7. The self configuring wireless network of claim 2, wherein said self configuration cycle includes a determination of signal strength.

8. The self configuring wireless network of claim 2, wherein said self configuration cycle is based on request messages that are sent after pseudo random delays.

9. The self configuring wireless network of claim 1, wherein each of said group of virtual network nodes store information regarding the identities and/or location of at least one other virtual network node.

10. The self configuring wireless network of claim 1, wherein each of said group of virtual network nodes stores a routing table that comprises routing information about at least one other virtual network node.

11. The self configuring wireless network of claim 1, wherein each of said group of virtual network nodes is configured to execute a polling procedure to poll at least one other virtual network nodes.

12. The self configuring wireless network of claim 1, wherein each of said group of virtual network nodes is configured with encryption capability to encrypt communications with at least one other virtual network node.

13. The self configuring wireless network of claim 1, wherein said virtual gate comprises a computer network gateway.

14. The self configuring wireless network of claim 1, wherein said virtual gate stores geographic location of all virtual network nodes within a pre-specified distance of said virtual gate.

15. The self configuring wireless network of claim 1, wherein said wireless communication link employs at least one multiplexed communication channel.

16. The self configuring wireless network of claim 1, wherein said wireless communication link includes a first channel used for upstream communication and a second channel used for downstream communication.

17. A self configuring wireless network, comprising:
(i) a group of virtual network nodes, each of said group of virtual network nodes supporting a wireless communication link, said group of virtual network nodes being capable of self configuring said group of virtual network nodes into an organized network via messaging between said group of virtual network nodes;
(ii) a gateway being communicatively coupled to said group of virtual network nodes and configured to provide a communication access point between said group of virtual network nodes and an external network, wherein access by an additional virtual network node, which is separate from said group of virtual network nodes, to said external network is facilitated by a route that includes a wireless communication link between said additional virtual network node and a first of said group of virtual network nodes and a path from said first of said group of virtual network nodes to said virtual gate defined by said organized network; and
(iii) an interface module configured to facilitate communication of event information between said virtual network nodes and said external network.

18. The self configuring wireless network of claim 17, wherein said interface module comprises:
a communication interface configured to accommodate communication between said virtual network nodes and said external network;
an event naming module configured to identify pre-specified events;
an event database configured to store information regarding the pre-specified events;
an event management module configured to process and manage occurrences of the pre-specified events; and
a communication management module configured to manage communication of the pre-specified events between the virtual network nodes and said external network.

19. The self configuring wireless network of claim 18, wherein said communication interface facilitates remote monitoring of at least one of said virtual network nodes.

20. The self configuring wireless network of claim 18, wherein said communication interface includes a customer interface.

21. The self configuring wireless network of claim 20, wherein said customer interface comprises a web browser interface, electronic mail interface, a customized Internet Protocol application interface, a telephone interface, a modem interface, and/or a paging device interface.

22. The self configuring wireless network of claim 18, wherein said communications interface includes a network interface.

23. The self configuring wireless network of claim 22, wherein said network interface comprises a Bluetooth interface, a cellular communication interface, a satellite communication interface, a MicroBurst interface, an Internet communication interface, an OrbComm interface, a GSM interface, and/or a Cellemetry interface.

24. The self configuring wireless network of claim 17, wherein said interface module further comprises a configuration management module that specifies one or more of interface information, protocol information, and pre-specified services.

25. The self configuring wireless network of claim 17, wherein said interface module further comprises a security management module that manages security of communications.

26. The self configuring wireless network of claim 17, wherein said interface module further comprises an error and recovery management module that manages detection of, and recovery from, communication errors.

27. The self configuring wireless network of claim 17, wherein said interface module further comprises a replication redundancy management module that replicates attribute information regarding the self configuration wireless communication network.

28. The self configuring wireless network of claim 17, wherein said interface module further comprises a billing module that tracks and bills usage of services provided by the self configuring wireless communication network.

29. The self configuring wireless network of claim 17, wherein said interface module further comprises an audit and logging module.

30. The self configuring wireless network of claim 17, wherein said interface module further comprises a publication and subscription management module that manages the publication of the occurrences of the pre-specified events.

* * * * *

(12) INTER PARTES REEXAMINATION CERTIFICATE (492nd)
United States Patent
Elliott et al.

(10) Number: US 8,019,836 C1
(45) Certificate Issued: *Dec. 12, 2012

(54) WIRELESS COMMUNICATION ENABLED METER AND NETWORK

(76) Inventors: Karl E. Elliott, Atlanta, GA (US); Kenneth W. Garrard, Atlanta, GA (US)

Reexamination Request:
No. 95/002,000, May 31, 2012

Reexamination Certificate for:
Patent No.: 8,019,836
Issued: Sep. 13, 2011
Appl. No.: 12/030,527
Filed: Feb. 13, 2008

(*) Notice: This patent is subject to a terminal disclaimer.

Related U.S. Application Data

(63) Continuation of application No. 10/040,150, filed on Jan. 2, 2002, now Pat. No. 7,379,981, which is a continuation of application No. 09/774,121, filed on Jan. 31, 2001, now abandoned, and a continuation-in-part of application No. 09/621,965, filed on Jul. 21, 2000, now abandoned.

(60) Provisional application No. 60/179,041, filed on Jan. 31, 2000, provisional application No. 60/179,046, filed on Jan. 31, 2000.

(51) Int. Cl.
*G06F 15/16* (2006.01)
*G06F 12/00* (2006.01)

(52) U.S. Cl. ........................................ 709/220; 709/223

(58) Field of Classification Search ........................ None
See application file for complete search history.

(56) References Cited

To view the complete listing of prior art documents cited during the proceeding for Reexamination Control Number 95/002,000, please refer to the USPTO's public Patent Application Information Retrieval (PAIR) system under the Display References tab.

*Primary Examiner* — Deandra M Hughes

(57) ABSTRACT

A meter enabled for wireless communication and a wireless communication network are disclosed. A meter enabled for wireless communication comprises a metering device, a wireless communication system and an interface between the two. Meter data can be read, and the meter can be controlled via communication with a wireless network using, e.g., the Bluetooth™ protocol A self-configuring wireless network is also disclosed. The wireless network includes a number of vnodes, and one or more VGATES. The vnodes are devices that are enabled for wireless communication using, e.g., the Bluetooth™ protocol. Vnodes are operative to form ad hoc piconet connections. The one or more VGATES comprise computer network gateways that are enabled for wireless communication using, e.g., the Bluetooth™ protocol. Thus, the VGATES enable the wireless array of vnodes to communicate with a private or public computer network to transmit data or receive commands. The network may also communicate with a VNOC system. VNOC is a universal communications adapter that enables the wireless array of vnodes to communicate (either directly or through a VGATE) with a central control facility via various wireless or wired communication media.

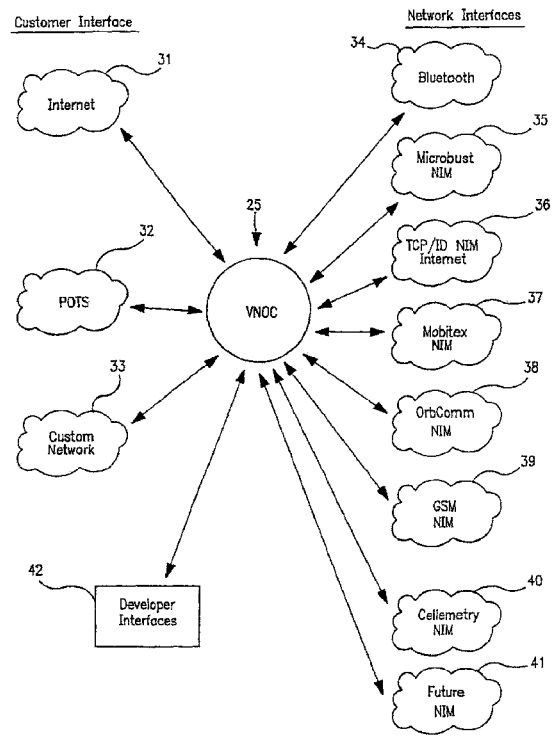

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-30 are cancelled.

* * * * *